United States Patent
Iwanaka et al.

(10) Patent No.: US 8,246,499 B2
(45) Date of Patent: Aug. 21, 2012

(54) DRIVE APPARATUS

(75) Inventors: Makoto Iwanaka, Anjo (JP); Shigeki Takami, Anjo (JP); Miyoshi Kawaguchi, Anjo (JP); Hideaki Komada, Susono (JP); Yukihiko Ideshio, Susono (JP); Takeshi Kitahata, Numazu (JP); Yoshihiro Iijima, Seto (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 1085 days.

(21) Appl. No.: 12/071,780

(22) Filed: Feb. 26, 2008

(65) Prior Publication Data

US 2008/0207374 A1    Aug. 28, 2008

(30) Foreign Application Priority Data

Feb. 26, 2007   (JP) ................................ 2007-045684

(51) Int. Cl.
*F16H 3/72* (2006.01)
(52) U.S. Cl. .......................................................... 475/5
(58) Field of Classification Search ................... 475/5
See application file for complete search history.

(56) References Cited

U.S. PATENT DOCUMENTS

| | | | |
|---|---|---|---|
| 7,101,309 B2 | 9/2006 | Ozeki et al. | |
| 7,261,658 B2* | 8/2007 | Bucknor et al. | 475/5 |
| 7,264,071 B2* | 9/2007 | Schmidt et al. | 180/65.6 |
| 7,494,435 B2* | 2/2009 | Bucknor et al. | 475/5 |
| 2006/0276288 A1* | 12/2006 | Iwanaka et al. | 475/5 |

FOREIGN PATENT DOCUMENTS

| | | |
|---|---|---|
| JP | A-11-227476 | 8/1999 |
| JP | A-2000-016101 | 1/2000 |
| JP | A-2000-142138 | 5/2000 |
| JP | A-2005-199942 | 7/2005 |
| JP | A-2005-291476 | 10/2005 |
| JP | B2 3807386 | 5/2006 |
| JP | A-2006-283917 | 10/2006 |

* cited by examiner

*Primary Examiner* — Jeffrey J Restifo
*Assistant Examiner* — Erez Gurari
(74) *Attorney, Agent, or Firm* — Oliff & Berridge, PLC

(57) ABSTRACT

A hybrid drive unit that includes an input shaft connected to an engine; an output shaft connected to wheels; a first rotary electric machine; a second rotary electric machine connected to the output shaft; a power distribution device that distributes a rotational driving force of the input shaft to the output shaft and to the first rotary electric machine; a second rotary electric machine fixing device that selectively fixes a rotor of the second rotary electric machine; and a transmission cutoff device capable of cutting off transmission of rotation between the output shaft and the second rotary electric machine at least in a state when the rotor of the second rotary electric machine is fixed.

7 Claims, 10 Drawing Sheets

| MODE | ENGAGEMENT ELEMENT | C1 | B1 | B2 | B3 |
|---|---|---|---|---|---|
| SPLIT | Lo | | ○ | | |
| | Hi | ○ | | | |
| | OD | | | ○ | |
| FIXED | OD | | | ○ | ○ |

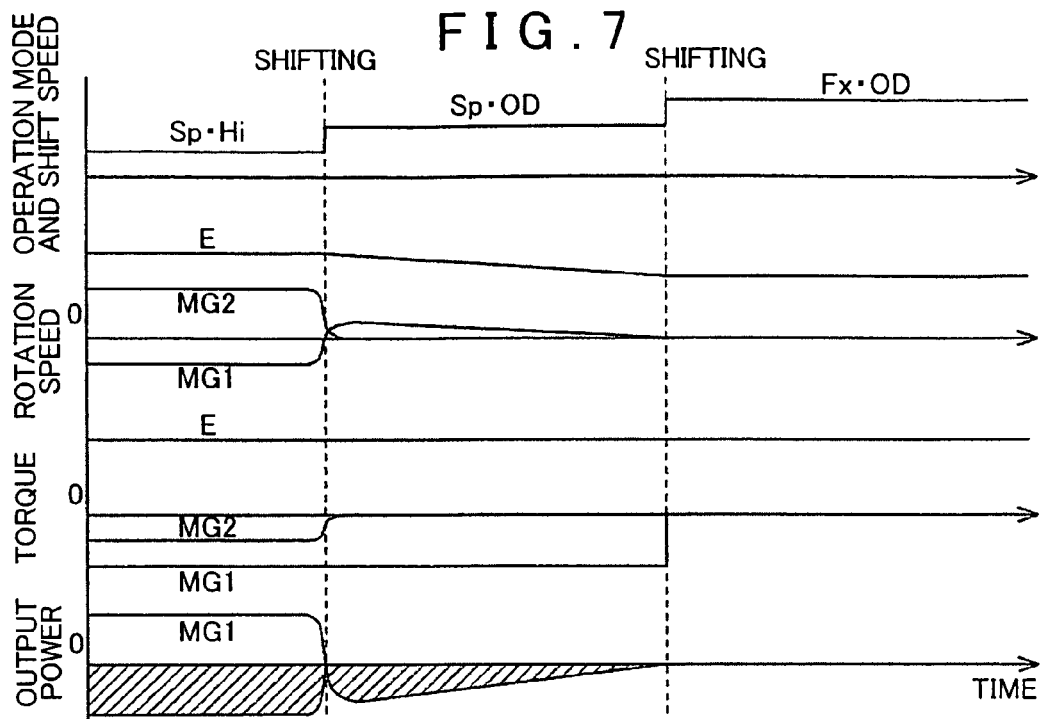
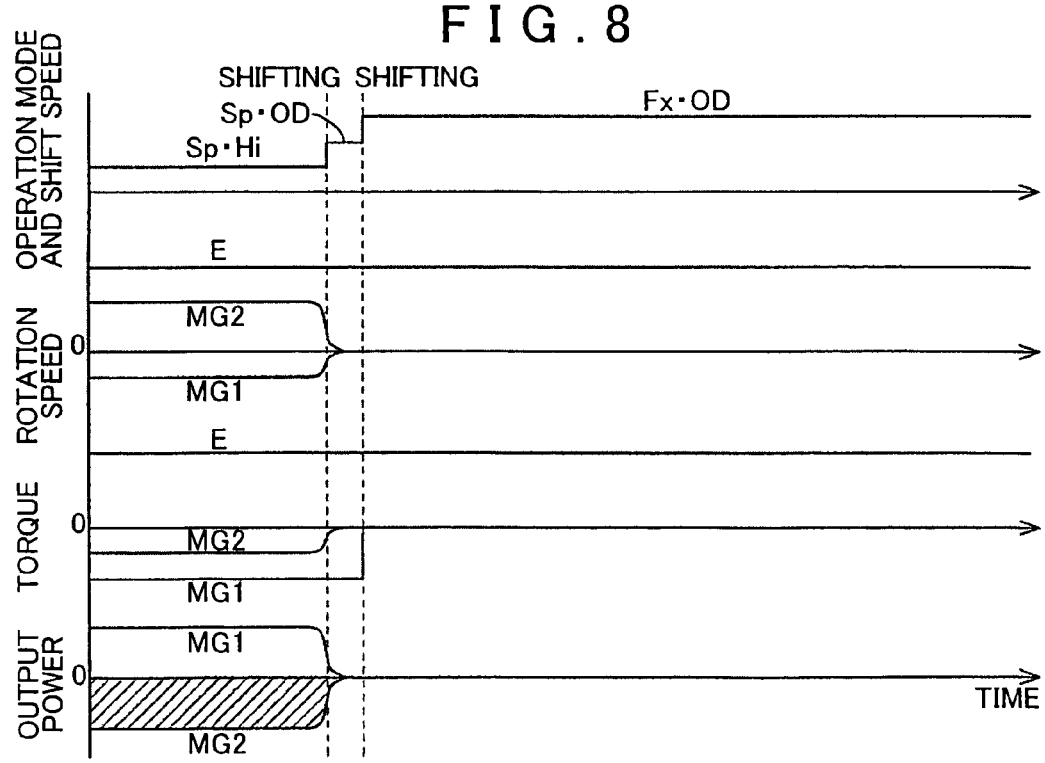

F I G . 10

| MODE \ ENGAGEMENT ELEMENT | | C1 | C2 | B2 | B3 |
|---|---|---|---|---|---|
| SPLIT | Lo | | ○ | | |
| | Hi | ○ | | | |
| | OD | | | ○ | |
| FIXED | OD | | | ○ | ○ |

FIG. 13
| MODE | ENGAGEMENT ELEMENT | C1 | B1 | B2 | B3 |
|---|---|---|---|---|---|
| SPLIT | Lo | ○ | | ○ | |
| SPLIT | Hi | ○ | ○ | | |
| SPLIT | OD | | ○ | ○ | |
| FIXED | OD | | ○ | ○ | ○ |
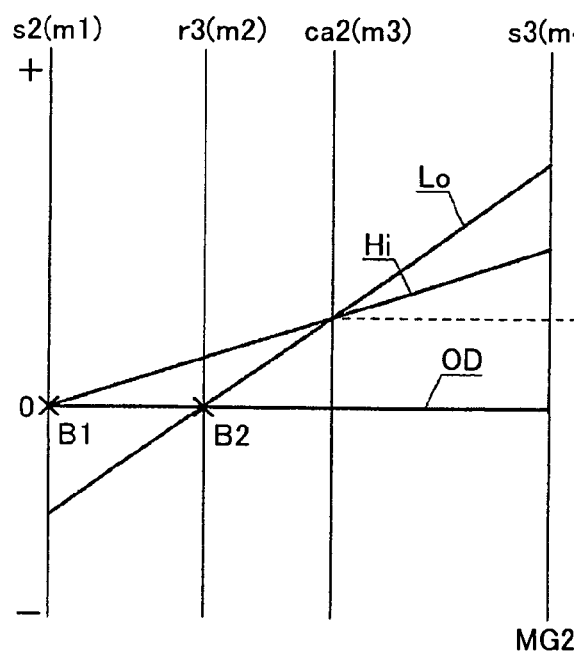
FIG. 14A
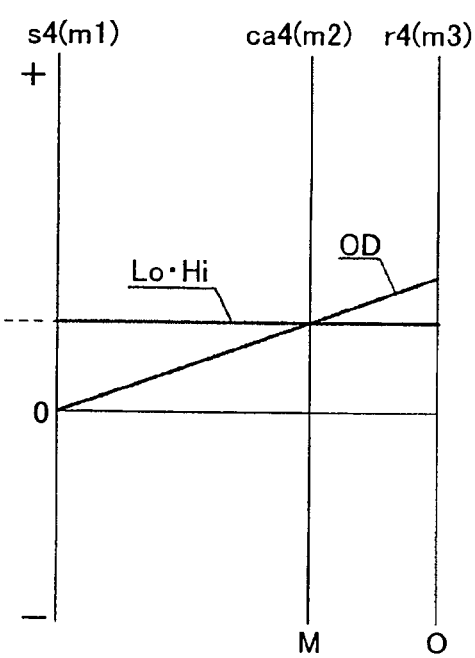
FIG. 14B

DRIVE APPARATUS

INCORPORATION BY REFERENCE

The disclosure of Japanese Patent Application No. 2007-045684 filed on Feb. 26, 2007 including the specification, drawings and abstract is incorporated herein by reference in its entirety.

BACKGROUND

The present invention relates to a hybrid drive unit.

In recent years, by combining an engine and rotary electric machines, hybrid vehicles that can enable the engine to improve fuel economy and to reduce exhaust emission have come into practical use. As an example of a hybrid drive unit used for such a hybrid vehicle, there exists a hybrid drive unit that includes an input shaft connected to an engine, an output shaft connected to wheels, a first rotary electric machine, a second rotary electric machine, a power distribution device for distributing a rotational driving force of the input shaft to the output shaft and to the first rotary electric machine, and a transmission device connected between the second rotary electric machine and the output shaft (refer, for example, to Japanese Patent Publication No. JP-3807386). In this hybrid drive unit, the transmission device is structured to have a plurality of shift speeds. By changing a rotation speed of the second rotary electric machine by a speed ratio corresponding to a rotation speed of the output shaft, the transmission device transmits the rotation speed to the output shaft.

In addition, in this hybrid drive unit, a high-speed mode is selected when a vehicle speed exceeds a predetermined value and also a requested torque is less than a predetermined value. Furthermore, this high-speed mode includes a normal mode and a cruise mode, and the cruise mode (high-speed cruise mode) is selected during a low load in which the requested torque to the second rotary electric machine is zero or less. In this high-speed cruise mode, a rotor of the first rotary electric machine is fixed by a brake, and also a brake of the transmission device is released to allow a rotating member of the transmission device disposed between the output shaft and the second rotary electric machine to run idle. Power is thus hardly transmitted between the output shaft and the second rotary electric machine.

Moreover, this hybrid drive unit is provided with a structure for minimizing the generation of a power loss (drag loss) caused by transmission of engine power, though a small quantity, to the second rotary electric machine and to the rotating member of the transmission device in the high-speed cruise mode as described above. In other words, this hybrid drive unit includes a judgment unit for judging an energy of the drag loss, and a control unit for controlling a rotation speed of the second rotary electric machine based on a judgment result by this judgment unit. In addition, this hybrid drive unit is structured to minimize the power loss of the hybrid drive unit by controlling the rotation speed of the second rotary electric machine so as to minimize the drag loss energy in the high-speed cruise mode.

SUMMARY

However, even with such a structure of the hybrid drive unit as described above, because a rotor of the second rotary electric machine rotates at a predetermined rotation speed in the high-speed cruise mode, the power loss (drag loss) by that rotation cannot totally be eliminated. In addition, core loss in the second rotary electric machine is generated by rotation of such a rotor.

The present invention provides a hybrid drive unit that can suppress the drag loss and the core loss of a rotor of a second rotary electric machine, under a low-load driving condition such as a high-speed cruise mode in which a driving force of the second rotary electric machine is not required to be transmitted to an output shaft. The present invention is also able to achieve various other advantages.

An exemplary hybrid drive unit includes an input shaft connected to an engine; an output shaft connected to wheels; a first rotary electric machine; a second rotary electric machine connected to the output shaft; a power distribution device that distributes a rotational driving force of the input shaft to the output shaft and to the first rotary electric machine; a second rotary electric machine fixing device that selectively fixes a rotor of the second rotary electric machine; and a transmission cutoff device capable of cutting off transmission of rotation between the output shaft and the second rotary electric machine at least in a state when the rotor of the second rotary electric machine is fixed.

Another exemplary hybrid drive unit includes an input shaft connected to an engine; an output shaft connected to wheels; a first rotary electric machine; a second rotary electric machine; a power distribution device that distributes a rotational driving force of the input shaft to the output shaft and to the first rotary electric machine; a transmission device connected between the second rotary electric machine and the output shaft, the transmission device being a planetary gear set that comprises at least a first rotation element, a second rotation element, a third rotation element and a fourth rotation element, the first rotation element being selectively fixed to a non-rotating member by a first brake, the second rotation element being connected to the output shaft, the third rotation element being connected to an output rotation element of the power distribution device, and the fourth rotation element being connected to a rotor of the second rotary electric machine and selectively fixed to a non-rotating member by a second brake; and a clutch that selectively connects the output rotation element of the power distribution device and the output shaft.

Another exemplary hybrid drive unit includes an input shaft connected to an engine; an output shaft connected to wheels; a first rotary electric machine; a second rotary electric machine; a power distribution device that distributes a rotational driving force of the input shaft to the output shaft and to the first rotary electric machine; a transmission device connected between the second rotary electric machine and the output shaft; and a first clutch that selectively connects the output rotation element of the power distribution device and the output shaft. The transmission device being structured so as to have a first planetary gear set and a second planetary gear set each comprising at least a first rotation element, a second rotation element and a third rotation element. The first planetary gear set having the first rotation element thereof fixed to a non-rotating member, the second rotation element thereof selectively connected to the output shaft by a second clutch, and the third rotation element thereof connected to rotate integrally with the second rotation element of the second planetary gear set and an output rotation element of the power distribution device. The second planetary gear set having the first rotation element thereof connected to the output shaft, and the third rotation element thereof connected to a rotor of the second rotary electric machine and selectively fixed to a non-rotating member by a brake.

Another exemplary hybrid drive unit includes an input shaft connected to an engine; an output shaft connected to wheels; a first rotary electric machine; a second rotary electric machine; a power distribution device that distributes a rotational driving force of the input shaft to the output shaft and to the first rotary electric machine; a transmission device connected between the second rotary electric machine and the output shaft; and a clutch that selectively connects the output rotation element of the power distribution device and the output shaft. The transmission device being structured so as to have a first planetary gear set that comprises at least a first rotation element, a second rotation element, a third rotation element and a fourth rotation element, and also so as to have a second planetary gear set that comprises at least a first rotation element, a second rotation element and a third rotation element. The first planetary gear set having the first rotation element thereof selectively fixed to a non-rotating member by a first brake, the second rotation element thereof selectively fixed to a non-rotating member by a second brake, the third rotation element thereof connected to rotate integrally with the first rotation element of the second planetary gear set, and the fourth rotation element thereof connected to a rotor of the second rotary electric machine. The second planetary gear set having the second rotation element thereof connected to an output rotation element of the power distribution device, and the third rotation element thereof connected to the output shaft.

Another exemplary hybrid drive unit includes an input shaft connected to an engine; an output shaft connected to wheels; a first rotary electric machine; a second rotary electric machine; a power distribution device that distributes a rotational driving force of the input shaft to the output shaft and to the first rotary electric machine; and a transmission device connected between the second rotary electric machine and the output shaft. The hybrid drive unit is structured to be switchable between a fixed accelerating mode in which both a rotor of the first rotary electric machine and a rotor of the second rotary electric machine are fixed and in which a rotation speed of the input shaft is accelerated and transmitted to the output shaft, and a split normal mode in which the rotational driving force of the input shaft is distributed to the first rotary electric machine and the output shaft through the power distribution device and in which a rotational driving force of the second rotary electric machine is transmitted to the output shaft through the transmission device.

BRIEF DESCRIPTION OF THE DRAWINGS

Various exemplary aspects of the invention will be described with reference to the drawings, wherein:

FIG. 7 shows timing charts showing operations of various parts during mode switching of the hybrid drive unit according to the first embodiment;

FIG. 8 shows timing charts showing operations of various parts during mode switching of the hybrid drive unit according to the first embodiment;

FIG. 10 is a view showing an operation table for the hybrid drive unit according to the second embodiment;

FIG. 13 is a view showing an operation table for the hybrid drive unit according to the third embodiment; and FIGS. 14A and 14B show velocity diagrams of a transmission device according to the third embodiment.

DETAILED DESCRIPTION OF EMBODIMENTS

1. First Embodiment

Figure 1:
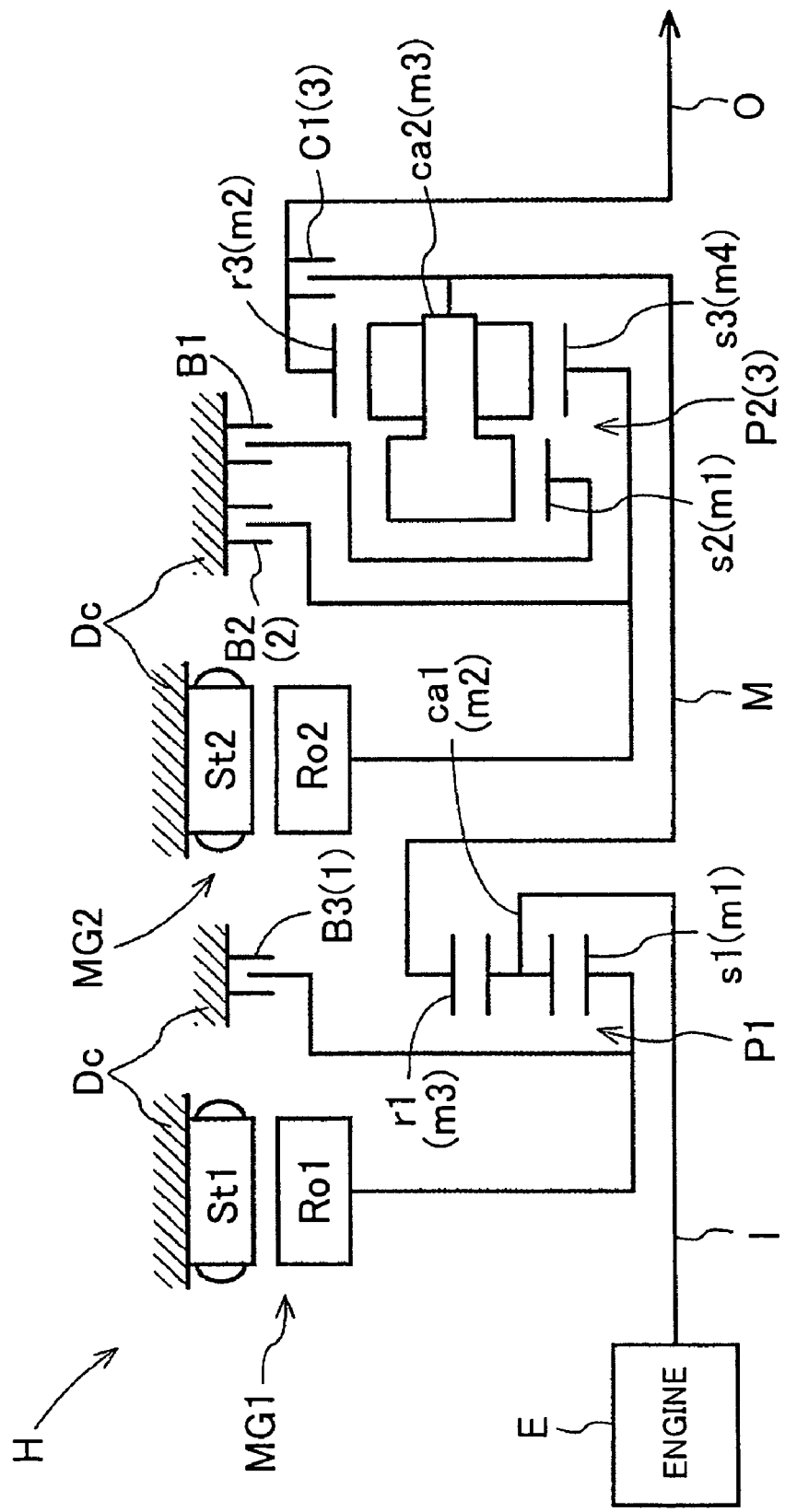
FIG. 1 is a skeleton diagram showing a hybrid drive unit according to a first embodiment of the present invention.
Figure 2:
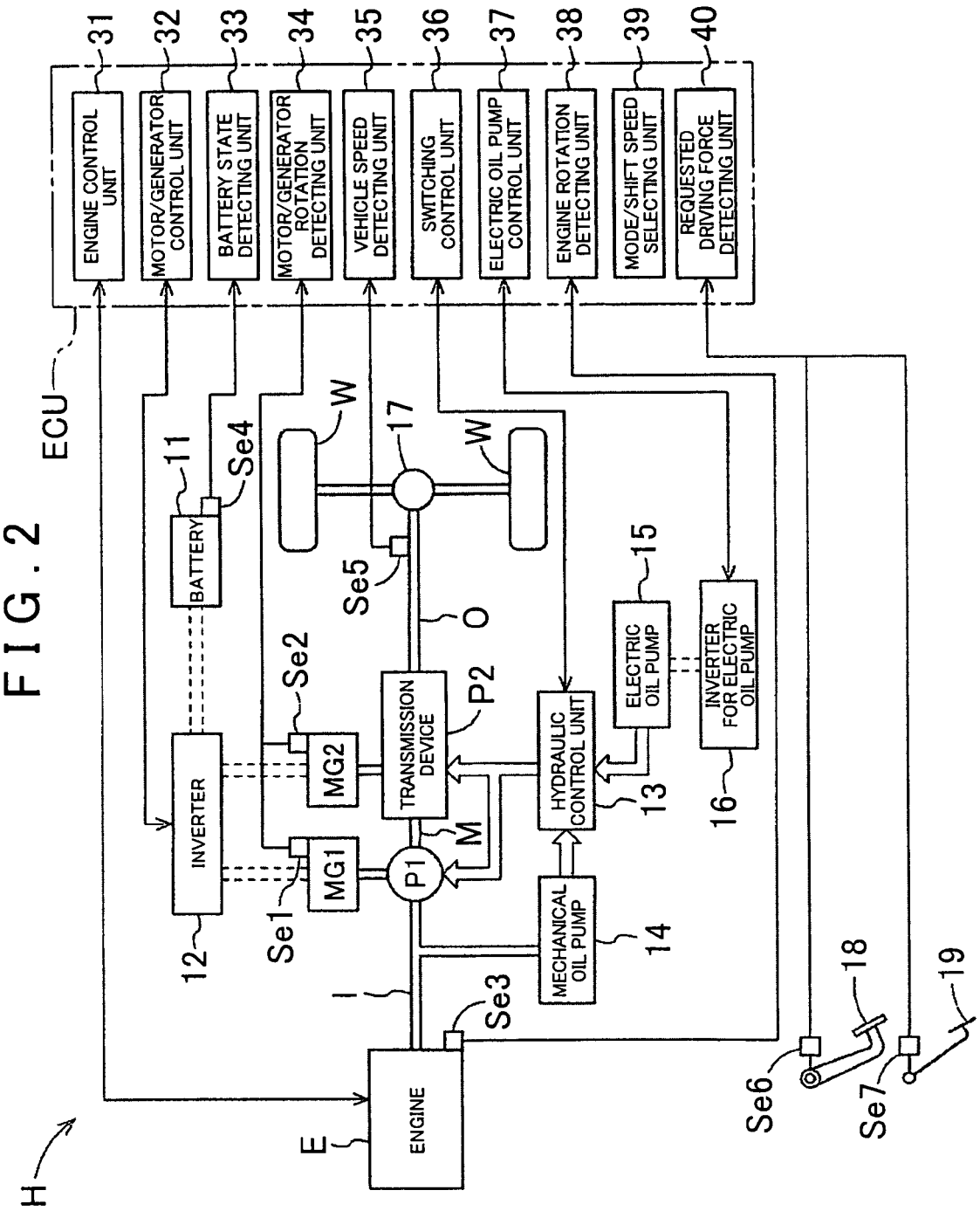
FIG. 2 is a system structure diagram of the hybrid drive unit according to the first embodiment.

A first embodiment of the present invention will first be described based on the drawings. FIG. 1 is a skeleton diagram showing a mechanical structure of a hybrid drive unit H of the present embodiment. Note that the lower half of the structure, which is symmetrical with respect to the central axis, is omitted from FIG. 1. FIG. 2 is a schematic diagram showing a system structure of the hybrid drive unit H of the present embodiment. Note that, in FIG. 2, double solid lines show transmission paths of driving force, double dashed lines show transmission paths of electric power, respectively, and outline arrows show flows of hydraulic oil. In addition, solid-line arrows show transmission paths of various kinds of information.

As shown in these figures, the hybrid drive unit H includes an input shaft I connected to an engine E, an output shaft O connected to wheels W, a first motor/generator MG1, a second motor/generator MG2, a power distribution device P1 for distributing a rotational driving force of the input shaft I to the output shaft O and to the first motor/generator MG1, and a transmission device P2 disposed between the second motor/generator MG2 and the output shaft O. These components are housed in a drive unit case Dc (hereinafter called simply "case Dc") as a non-rotating member which is fixed to a vehicle body. This hybrid drive unit H is structured to fix a rotor Ro2 of the second motor/generator MG2, cut off the transmission of rotation between the output shaft O and the second motor/generator MG2, and accelerate the rotation speed of the input shaft I and transmit it to the output shaft O using the transmission device P2. Note that, in the present embodiment, the first motor/generator MG1 corresponds to a "first rotary electric machine" of the present invention, and the second motor/generator MG2 corresponds to a "second rotary electric machine" of the present invention.

1-1. Mechanical Structure of Hybrid Drive Unit H

First, the mechanical structure of the hybrid drive unit H of the present embodiment will be described. As shown in FIGS. 1 and 2, the input shaft I is connected to the engine E. Here, various kinds of heretofore known internal combustion engines such as a gasoline engine and a diesel engine can be used as the engine E. In the present example, the input shaft I is integrally connected to an output rotating shaft, such as a crankshaft, of the engine E. It is preferable to have a structure in which the input shaft I is connected to the output rotating shaft of the engine E with a damper or a clutch interposed therebetween. The output shaft O is connected to the wheels W so as to be able to transmit the rotational driving force through a differential device 17, and so on. An intermediate shaft M is connected to a ring gear r1 of the power distribution device P1 and a carrier ca2 of the transmission device P2, so as to couple them and rotate integrally with them. The intermediate shaft M is also selectively connected to the output shaft O through a first clutch C1. In the present embodiment, the input shaft I, the output shaft O, and the intermediate shaft M are all arranged coaxially with each other.

The first motor/generator MG1 has a stator St1 that is fixed to the case Dc, and a rotor Ro1 that is rotatably supported radially inside the stator St 1. The rotor Ro1 of the first motor/generator MG1 is coupled to rotate integrally with a sun gear s1 of the power distribution device P1. The second motor/generator MG2, on the other hand, has a stator St2 that is fixed to the case Dc, and a rotor Ro2 that is rotatably supported radially inside the stator St2. The rotor Ro2 of the second motor/generator MG2 is coupled to rotate integrally with a second sun gear s3 of the transmission device P2. The first motor/generator MG1 and the second motor/generator MG2 are electrically connected, respectively through an inverter 12, to a battery 11 serving as an electric storage device, as shown in FIG. 2. Thus, the first motor/generator MG1 and the second motor/generator MG2 can serve respectively as a motor (electric rotating machine) that is supplied with electric power and generates motive power, and as a generator (electricity generating machine) that is supplied with motive power and generates electric power.

In the present example, the first motor/generator MG1, mainly serving as a generator which generates electric power by a driving force input through the sun gear s1 of the power distribution device P1, charges the battery 11, or supplies electric power to drive the second motor/generator MG2. However, there can be a case in which the first motor/generator MG1 serves as a motor during high-speed driving of a vehicle. On the other hand, the second motor/generator MG2 mainly serves as a motor that provides a driving force for vehicle running. However, when the first motor/generator MG1 serves as a motor during high-speed driving of the vehicle, the second motor/generator MG2 serves as a generator. In addition, when the vehicle is decelerating, the second motor/generator MG2 serves also as a generator that regenerates electric energy from inertia force of the vehicle. Such operations of the first motor/generator MG1 and the second motor/generator MG2 are performed according to control commands from a control unit ECU.

As shown in FIG. 1, the power distribution device P1 is composed of a planetary gear mechanism of a single pinion type that is arranged coaxially with the input shaft I. In other words, the power distribution device P1 has, as rotation elements, a carrier ca1 that supports a plurality of pinion gears, as well as the sun gear s1 and the ring gear r1 that respectively mesh with the pinion gears. The sun gear s1 is connected to rotate integrally with the rotor Ro1 of the first motor/generator MG1, and is further selectively fixed to the case Dc by a third brake B3. The carrier ca1 is connected to rotate integrally with the input shaft I. The ring gear r1 is connected to rotate integrally with the intermediate shaft M. As a result, the ring gear r1 is connected to the output shaft O, through the intermediate shaft M and the transmission device P2, or through the first clutch C1 if the first clutch C1 is in an engagement state. Accordingly, the ring gear r1 serves as an "output rotation element" of the power distribution device P1. In the present embodiment, the sun gear s1, the carrier ca1, and the ring gear r1 respectively correspond to a "first rotation element m1," a "second rotation element m2," and a "third rotation element m3" of the power distribution device P1 of the present invention. In addition, in the present embodiment, because the third brake B3 can selectively fix the rotor Ro1 of the first motor/generator MG1, the third brake B3 forms a "first rotary electric machine fixing device 1" of the present invention.

The transmission device P2 of the present embodiment is composed of a four-element planetary gear set including four rotation elements that is arranged coaxially with the input shaft I. In other words, the transmission device P2 has, as rotation elements, two sun gears, i.e., a first sun gear s2 and the second sun gear s3, a ring gear r3, and the carrier ca2. Here, the carrier ca2 is structured so as to rotatably support both a short pinion gear that meshes with both the second sun gear s3 and the ring gear r3, and a stepped long pinion gear whose large diameter portion meshes with the first sun gear s2 and whose small diameter portion meshes with the short pinion gear. The first sun gear s2 is selectively fixed to the case Dc by a first brake B1. The ring gear r3 is connected to rotate integrally with the output shaft O. The carrier ca2 is connected to rotate integrally with the ring gear r1 of the power distribution device P1 through the intermediate shaft M. The second sun gear s3 is connected to rotate integrally with the rotor Ro2 of the second motor/generator MG2, and also selectively fixed to the case Dc by a second brake B2. In the present embodiment, the first sun gear s2, the ring gear r3, the carrier ca2, and the second sun gear s3 respectively correspond to the "first rotation element m1," the "second rotation element m2," the "third rotation element m3," and a "fourth rotation element m4" of the transmission device P2 of the present invention. In addition, in the present embodiment, because the second brake B2 can selectively fix the rotor Ro2 of the second motor/generator MG2 to the case Dc, the second brake B2 forms a "second rotary electric machine fixing device 2" of the present invention.

Moreover, the carrier ca2 and the ring gear r3 of the transmission device P2 are selectively connected to each other by the first clutch C1. Therefore, the intermediate shaft M, which is connected to the carrier ca2 of the transmission device P2, and the ring gear r1, which is the output rotation element of the power distribution device P1, are selectively connected to the output shaft O, which is connected to the ring gear r3 of the transmission device P2, by the first clutch C1. In other words, in the engagement state of the first clutch C1, the ring gear r1 of the power distribution device P1 is connected to rotate integrally with the output shaft O. In addition, in such an engagement state of the first clutch C1, the transmission device P2 is brought into a directly connected state in which all of the rotation elements s2, s3, ca2, and r3 rotate integrally. On the other hand, in the disengagement state of the first clutch C1, the ring gear r1 of the power distribution device P1 is connected to the output shaft O through the transmission device P2.

As described above, the second motor/generator MG2 is connected to rotate integrally with the second sun gear s3 of the transmission device P2, and the output shaft O is connected to rotate integrally with the ring gear r3 of the transmission device P2. Accordingly, the second motor/generator MG2 is connected to the output shaft O through the transmission device P2, more specifically, through the second sun gear s3, the carrier ca2, and the ring gear r3. In the transmission device P2, when the first clutch C1 is disengaged, and the rotor Ro2 of the second motor/generator MG2 and the second sun gear s3 are fixed to the case Dc by the second brake B2, rotation is transmitted between the intermediate shaft M and the output shaft O through the carrier ca2 and the ring gear r3, but that rotation is not transmitted to the second sun gear s3. Therefore, the transmission device P2 is structured so as to be able to cut off the transmission of the rotation between the output shaft O and the second motor/generator MG2 by disengaging the first clutch C1, under the state in which the rotor Ro2 of the second motor/generator MG2 is fixed by the second brake B2. In addition, under such a state in which the first clutch C1 is disengaged, and the rotor Ro2 of the second motor/generator MG2 and the second sun gear s3 are fixed to the case Dc by the second brake B2, the transmission device P2 is structured such that the rotation speed of the carrier ca2 (the intermediate shaft M) is accelerated and transmitted to the output shaft O. Therefore, the transmission device P2 is structured such that the rotation speed of the ring gear r1, which is the output rotation element of the power distribution device P1, is accelerated and transmitted to the output shaft O. Consequently, in the present embodiment, the first clutch C1 and the transmission device P2 form a "transmission cutoff device 3" of the present invention.

As described above, this hybrid drive unit H includes, as friction engagement elements, the first clutch C1, the first brake B1, the second brake B2, and the third brake B3. As these friction engagement elements, multi-plate clutches and multi-plate brakes, both of which are hydraulically operated, can be used. As shown in FIG. 2, the hydraulic pressure supplied to these friction engagement elements is controlled by a hydraulic control unit 13 that operates by control commands from the control unit ECU. The hydraulic oil is supplied to the hydraulic control unit 13 by a mechanical oil pump 14 while the engine E is running, and by an electric oil pump 15 when the engine E is not running. Here, the mechanical oil pump 14 is driven by a rotational driving force of the input shaft I. The electric oil pump 15 is driven by electric power supplied from the battery 11 through an inverter 16 for electric oil pump (supply path not shown). Note that, in FIG. 2, the first clutch C1, the first brake B1, and the second brake B2 are not shown as included in the transmission device P2, and the third brake B3 is also not shown as included in the power distribution device P1.

1-2. Structure of Control System of Hybrid Drive Unit H

Next, a structure of a control system of the hybrid drive unit H of the present embodiment will be described. As shown in FIG. 2, the control unit ECU performs operation control of the friction engagement elements C1, B1, B2, and B3 (refer to FIG. 1), and the electric oil pump 15, for example, through the engine E, the first motor/generator MG1, the second motor/generator MG2, and the hydraulic control unit 13, using information obtained by sensors Se1 to Se7 installed at various locations of the vehicle. As these sensors, in the present example, a first motor/generator rotation speed sensor Se1, a second motor/generator rotation speed sensor Se2, an engine rotation speed sensor Se3, a battery state detecting sensor Se4, a vehicle speed sensor Se5, an accelerator operation detecting sensor Se6, and a brake operation detecting sensor Se7 are installed.

Here, the first motor/generator rotation speed sensor Se1 is a sensor to detect a rotation speed of the rotor Ro1 of the first motor/generator MG1. The second motor/generator rotation speed sensor Se2 is a sensor to detect a rotation speed of the rotor Ro2 of the second motor/generator MG2. The engine rotation speed sensor Se3 is a sensor to detect a rotation speed of the output rotating shaft of the engine E. Here, because the input shaft I rotates integrally with the output rotating shaft of the engine E, the rotation speed of the engine E detected by the engine rotation speed sensor Se3 coincides with the rotation speed of the input shaft I. The battery state detecting sensor Se4 is a sensor to detect a state such as an amount of charge of the battery 11. The vehicle speed sensor Se5 is a sensor to detect a rotation speed of the output shaft O, in order to detect a vehicle speed. The accelerator operation detecting sensor Se6 is a sensor to detect an amount of operation of an accelerator pedal 18. The brake operation detecting sensor Se7 is a sensor to detect an amount of operation of a brake pedal 19 which operates in association with wheel brakes (not shown).

Besides, the control unit ECU includes an engine control unit 31, a motor/generator control unit 32, a battery state detecting unit 33, a motor/generator rotation detecting unit 34, a vehicle speed detecting unit 35, a switching control unit 36, an electric oil pump control unit 37, an engine rotation detecting unit 38, a mode/shift speed selecting unit 39, and a requested driving force detecting unit 40. These units included in the control unit ECU are structured such that, using an arithmetic processing unit, such as a CPU, as a core member, functional portions thereof for performing various processing on input data are implemented by hardware, software (programs), or both.

The engine control unit 31 performs operation control of the engine E, such as starting and stopping operation, rotation speed control, and output torque control. The motor/generator control unit 32 performs, through the inverter 12, operation control of the first motor/generator MG1 and the second motor/generator MG2, such as rotation speed control and torque control. The battery state detecting unit 33 detects the state, such as the amount of charge, of the battery 11, based on the output of the battery state detecting sensor Se4. The motor/generator rotation detecting unit 34 detects the rotation speeds of the first motor/generator MG1 and the second motor/generator MG2, based on the outputs of the first motor/generator rotation speed sensor Se1 and the second motor/generator rotation speed sensor Se2. The vehicle speed detecting unit 35 detects the vehicle speed, based on the output of the vehicle speed sensor Se5.

The switching control unit 36 engages or disengages the friction engagement elements C1, B1, B2, and B3 (refer to FIG. 1) of the hybrid drive unit H by controlling the operation of the hydraulic control unit 13, and performs switching control of operation mode and shift speed of the hybrid drive unit H. The electric oil pump control unit 37 performs operation control of the electric oil pump 15, through the inverter 16 for electric oil pump. The engine rotation detecting unit 38 detects rotation speeds of the output rotating shaft of the engine E and the input shaft I, based on the output from the engine rotation speed sensor Se3. The requested driving force detecting unit 40 calculates and obtains the driving force requested by the driver, based on the outputs from the accelerator operation detecting sensor Se6 and the brake operation detecting sensor Se7.

Figures 3, 4:
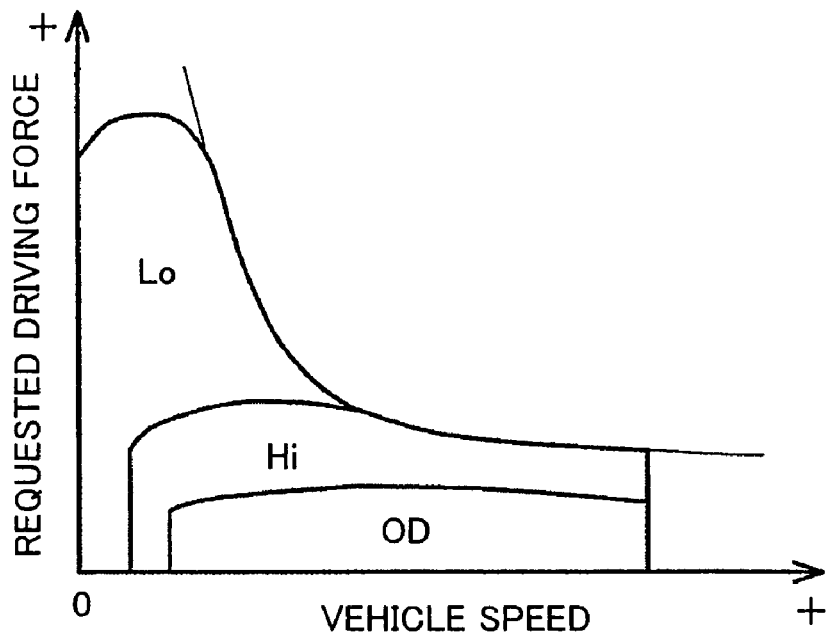
FIG. 3 is a diagram showing an example of a control map for the hybrid drive unit according to the first embodiment.
FIG. 4 is a view showing an operation table for the hybrid drive unit according to the first embodiment.

The mode/shift speed selecting unit 39 selects the operation mode and the shift speed, according to such information as a control map shown in FIG. 3 and the state of the battery 11 detected by the battery state detecting unit 33. FIG. 3 is a diagram showing a map that predefines the relation among vehicle speed and requested driving force, and each area covered by each shift speed that is included in each operation mode. In this diagram, the horizontal axis represents the vehicle speed, and the vertical axis represents the requested driving force which is obtained by the requested driving force detecting unit 40, based on the amount of operation of the accelerator pedal, and so on. The mode/shift speed selecting unit 39 selects an appropriate shift speed according to the control map, depending on the vehicle speed and the requested driving force. Specifically, the mode/shift speed selecting unit 39 obtains information on the vehicle speed from the vehicle speed detecting unit 35. The mode/shift speed selecting unit 39 also obtains information on the requested driving force from the requested driving force detecting unit 40. Then, the mode/shift speed selecting unit 39 selects, according to the control map shown in FIG. 3, a shift speed which is defined depending on the vehicle speed and the requested driving force obtained.

In the present example, a shift speed is selected from three speeds of a low speed (Lo) in a split mode, a high speed (Hi) in a split mode, and an overdrive speed (OD) in a split mode or fixed mode. In other words, the mode/shift speed selecting unit 39 selects a shift speed depending on the area that matches, that is, the low-speed area (the area indicated as "Lo" in FIG. 3), the high-speed area (the area indicated as "Hi" in FIG. 3), and the overdrive speed area (the area indicated as "OD" in FIG. 3), the point determined by the vehicle speed, which is detected by the vehicle speed detecting unit 35, and the requested driving force, which is detected by the requested driving force detecting unit 40, is located on the control map shown in FIG. 3. Here, the vehicle speed and the rotation speed of the output shaft O can be regarded as similar to each other because a constant relation holds between them. Therefore, in the present embodiment, the overdrive speed area on the control map shown in FIG. 3 corresponds to a "high-rotation speed and low-driving force range" of the present invention. In addition, when the overdrive speed (OD) is selected, the mode/shift speed selecting unit 39 selects either operation mode of the split mode or the fixed mode, based on such information as the state of the battery 11 detected by the battery state detecting unit 33.

1-3. Operation Modes of Hybrid Drive Unit H

Next, the operation modes that can be realized by the hybrid drive unit H of the present embodiment will be described. FIG. 4 is an operation table showing a plurality of operation modes and the operating states of the friction engagement elements C1, B1, B2, and B3 at each shift speed included in each operation mode. In this figure, "O" indicates a friction engagement element that is in an engagement state. On the other hand, "no mark" indicates a friction engagement element that is in a disengagement state. As shown in this figure, this hybrid drive unit H is structured such that it can be switched between two operation modes of "split mode" and "fixed mode." Here, the split mode is a mode in which the rotational driving force of the input shaft I is distributed to the first motor/generator MG1 and to the intermediate shaft M on the side of the output shaft O, through the power distribution device P1. The fixed mode is a mode in which both the rotor Ro1 of the first motor/generator MG1 and the rotor Ro2 of the second motor/generator MG2 are fixed, and the rotation speed of the input shaft I is transmitted to the output shaft O. This hybrid drive unit H has three shift speeds of the low speed (Lo), the high speed (Hi), and the overdrive speed (OD), in the split mode. On the other hand, in this hybrid drive unit H, the only shift speed in the fixed mode is the overdrive speed (OD). At the low speed (Lo) and the high speed (Hi) in the split mode, the rotational driving force of the rotor Ro2 of the second motor/generator MG2 is transmitted to the output shaft O through the transmission device P2, whereas at the overdrive speed (OD) in both the split mode and the fixed mode, the rotor Ro2 of the second motor/generator MG2 is fixed.

Figure 5:
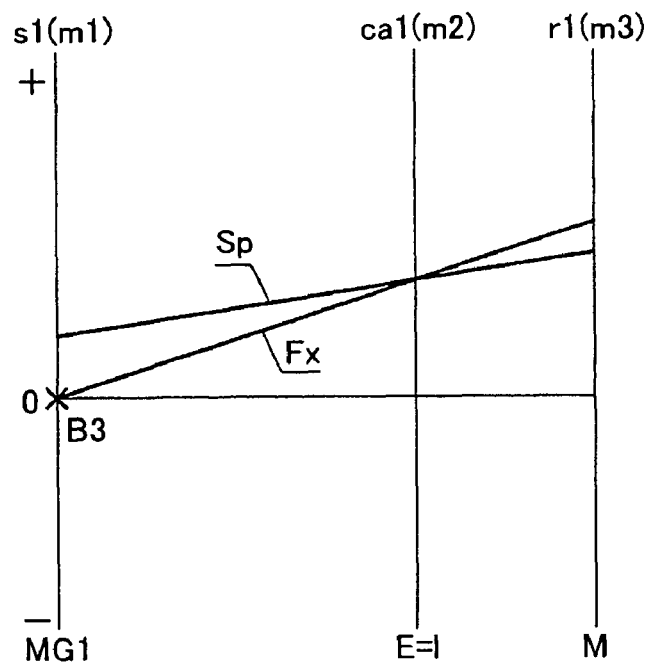
FIG. 5 is a velocity diagram of a power distribution device according to the first embodiment.
Figure 6:
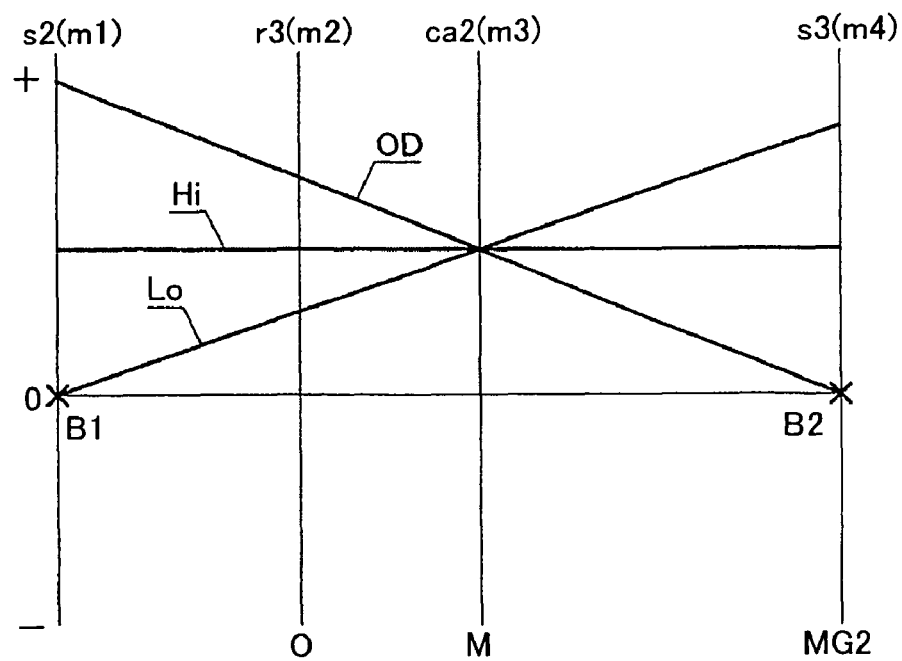
FIG. 6 is a velocity diagram of a transmission device according to the first embodiment.

In addition, FIG. 5 shows a velocity diagram of the power distribution device P1, and FIG. 6 shows a velocity diagram of the transmission device P2. In these velocity diagrams, each vertical axis corresponds to the rotation speed of each rotation element. In other words, "0" that is written corresponding to the vertical axis indicates that the rotation speed is zero, representing that upside is positive and downside is negative. Besides, each of the parallel arranged multiple vertical lines corresponds to each rotation element of the power distribution device P1 or the transmission device P2. In other words, "s1," "ca1," and "r1," which are written at the top of the vertical lines in FIG. 5, correspond to the sun gear s1, the carrier ca1, and the ring gear r1, respectively, of the power distribution device P1. Similarly, "s2," "r3," "ca2," and "s3," which are written at the top of the vertical lines in FIG. 6, correspond to the first sun gear s2, the ring gear r3, the carrier ca2, and the second sun gear s3, respectively, of the transmission device P2. Moreover, the spaces between the vertical lines corresponding to the rotation elements correspond to the gear ratios of the power distribution device P1 and the transmission device P2. Note that "E," "MG1," "MG2," "M," and "O," which are written at the bottom of the vertical lines in these velocity diagrams, respectively represent the engine E, the first motor/generator MG1, the second motor/generator MG2, the intermediate shaft M, and the output shaft O, which are connected to rotate integrally with the rotation elements represented by the respective vertical lines. In addition, the mark "X" in these velocity diagrams indicates that the brake B1, B2, or B3 is engaged.

In addition, in FIG. 5, the straight line Sp indicates an example of an operating state of the power distribution device P1 in the split mode, and the straight line Fx indicates an operating state of the power distribution device P1 in the fixed mode. Furthermore, in FIG. 6, the straight lines Lo, Hi, and OD indicate the operating states of the transmission device P2 at the low speed (Lo), the high speed (Hi), and the overdrive speed (OD), respectively. In the following description, when a simple term "low speed (Lo)" or "high speed (Hi)" is used, the term represents the low speed in split mode or the high speed in split mode, respectively, and when a simple term "overdrive speed (OD)" is used, the term represents the overdrive speed (OD) in split mode or fixed mode. In addition, when a simple term "shift speed" is used in the following description, the term inclusively refers to all or part of a plurality of shift speeds in the split mode and the fixed mode.

As described above, each of these operation modes and shift speeds are selected by the mode/shift speed selecting unit 39, based on such information as the control map shown in FIG. 3 and the state of the battery 11. Then, switching to the selected operation mode and shift speed is performed by engaging or disengaging the friction engagement elements C1, B1, B2, and B3, through control commands from the control unit ECU. In this case, the control unit ECU also performs control of the rotation speed and torque of the first motor/generator MG1 and the second motor/generator MG2 using the motor/generator control unit 32, and further performs control of the rotation speed and torque of the engine E using the engine control unit 31. The operating state of the hybrid drive unit H in each operation mode and shift speed will be described in detail below, separately with respect to the operating state of the power distribution device P1 and the operating state of the transmission device P2.

1-4. Operating State of Power Distribution Device

As shown in FIG. 5, the power distribution device P1 is brought into different operating states in the split mode and in the fixed mode. When the power distribution device P1 is operating in the split mode, the carrier ca1, which is ranked in the middle in the order of rotation speed, rotates integrally with the input shaft I (the engine E), and its rotation is distributed to the sun gear s1 and the ring gear r1, as indicated by the straight line Sp in FIG. 5. Then, the rotation distributed to the sun gear s1 is transmitted to the rotor Ro1 of the first motor/generator MG1, and the rotation distributed to the ring gear r1 as an output rotation element is transmitted to the intermediate shaft M (refer to FIG. 1). At this time, the engine E transmits a positive torque to the carrier ca1 through the input shaft I, while being controlled so as to be kept in a high efficiency and low exhaust emission state, depending on the requested driving force obtained by the requested driving force detecting unit 40. Note that, in general, the high efficiency and low exhaust emission state is a state consistent with optimum fuel economy characteristics, and the engine E is controlled in its rotation speed and torque so as to be in such a state. In addition, the first motor/generator MG1 transmits the reaction torque of the input shaft I to the sun gear s1, by outputting a negative torque. Then, the rotation speed of the ring gear r1 (the intermediate shaft M) is determined by the rotation speed of the first motor/generator MG1. In a normal driving condition, the first motor/generator MG1 performs electric power generation, by generating a negative torque while rotating in the positive direction (rotation speed is positive). On the other hand, when the vehicle speed becomes high (rotation speed of the output shaft O becomes high), and the rotation speed of the intermediate shaft M becomes relatively high compared with the rotation speed of the engine E, the first motor/generator MG1 performs power running, by generating a negative torque while rotating in the negative direction (rotation speed is negative). In the state, as described above, where the first motor/generator MG1 performs power running, the second motor/generator MG2 performs electric power generation, by generating a torque in the direction opposite to the rotation of the rotor Ro2.

In addition, when the power distribution device P1 is operating in the fixed mode, the third brake B3 is engaged, and thus the sun gear s1 is fixed to the case Dc, as indicated by the straight line Fx in FIG. 5. As a result, the rotor Ro1 of the first motor/generator MG1 is also fixed to the case Dc, and its rotation speed becomes zero. At this time, the rotation speed of the engine E and the input shaft I is accelerated depending on the gear ratio of the power distribution device P1, and is transmitted to the intermediate shaft M. Note that, in the present embodiment, the shift speed always becomes the overdrive speed (OD) and the second brake B2 is brought into an engagement state in the fixed mode, as shown in FIG. 4. Therefore, in the fixed mode, the rotor Ro2 of the second motor/generator MG2 is also fixed to the case Dc, and its rotation speed becomes zero.

1-5. Operating State of Transmission Device

As shown in FIG. 6, the transmission device P2 is brought into different operating states depending on which one of the low speed (Lo), the high speed (Hi), and the overdrive speed (OD), its shift speed is switched. On the other hand, the transmission device P2 is brought, unlike the power distribution device P1, into the same operating state in both the split mode and the fixed mode (both at the overdrive speed (OD)). In addition, when the transmission device P2 is operating at the low speed (Lo), the first brake B1 is engaged, and thus the first sun gear s2 is fixed to the case Dc. As a result, the rotation speed of the intermediate shaft M is decelerated and transmitted to the output shaft O, and also the rotation speed of the second motor/generator MG2 is decelerated and transmitted to the output shaft O, as indicated by the straight line Lo in FIG. 6. When the transmission device P2 is operating at the high speed (Hi), the first clutch C1 is engaged, resulting in a directly connected state in which the whole of the transmission device P2 rotates integrally. As a result, the rotation speed of the intermediate shaft M and the second motor/generator MG2 is transmitted to the output shaft O without change, as indicated by the straight line Hi in FIG. 6.

Therefore, at the low speed (Lo) and the high speed (Hi), the torque of the second motor/generator MG2 after a speed change (decelerated or without change) at a predetermined gear ratio through the second motor/generator MG2, and the torque of the engine E (the input shaft I) distributed from the power distribution device P1 to the intermediate shaft M are summed and output from the output shaft O. In other words, at the low speed (Lo) and the high speed (Hi) in the split mode, if the rotational driving force that is transmitted form the intermediate shaft M to the output shaft O through the transmission device P2 falls short of the requested driving force, the second motor/generator MG2 is made to perform power running. In this way, the vehicle can be driven with the rotational driving force of the engine E assisted by the rotational driving force of the second motor/generator MG2.

In addition, when the transmission device P2 is operating at the overdrive speed (OD), the second brake B2 is engaged, and thus the second sun gear s3 is fixed to the case Dc. As a result, the rotor Ro2 of the second motor/generator MG2 is also fixed to the case Dc, and its rotation speed becomes zero, as indicated by the straight line OD in FIG. 6. At this time, the rotation speed of the intermediate shaft M is accelerated depending on the gear ratio of the transmission device P2, and transmitted to the output shaft O. Because the rotor Ro2 of the second motor/generator MG2 is fixed to the case Dc at the overdrive speed (OD) as described above, only the torque of the engine E (the input shaft I) distributed from the power distribution device P1 to the intermediate shaft M is transmitted to the output shaft O. As described above, the mode/shift speed selecting unit 39 selects, based on the control map shown in FIG. 3, the overdrive speed (OD) when the point determined by the vehicle speed and the requested driving force is located in the overdrive speed area (the area indicated as "OD" in FIG. 3). Therefore, when the rotation speed of the output shaft O, which can be regarded as similar to the vehicle speed, and the requested driving force reside in the overdrive speed area which corresponds to the prescribed high-rotation speed and low-driving force range, the rotor Ro2 of the second motor/generator MG2 is fixed to the case Dc by the second brake B2 as the second rotary electric machine fixing device 2. Note that the operating state of the transmission device P2 at the overdrive speed (OD) is common in both the split mode and the fixed mode.

As described above, at the low speed (Lo) and the high speed (Hi) in the split mode, the third brake B3 is disengaged, and thus the rotational driving force of the input shaft I is distributed to the first motor/generator MG1 and to the intermediate shaft M on the side of the output shaft O, through the power distribution device P1. In addition, the rotation of the second motor/generator MG2 is transmitted to the output shaft O, through the transmission device P2. Therefore, the low speed (Lo) and the high speed (Hi) in the split mode correspond to a "split normal mode" of the present invention.

In addition, at the overdrive speed (OD) in the split mode, the third brake B3 is disengaged, and thus the rotational driving force of the input shaft I is distributed to the first motor/generator MG1 and to the intermediate shaft M on the side of the output shaft O, through the power distribution device P1. Further, the second brake B2 is engaged; thus, the rotor Ro2 of the second motor/generator MG2 is fixed, and also the rotation speed of the input shaft I is accelerated and transmitted to the output shaft O, by the transmission device P2. Therefore, the overdrive speed (OD) in the split mode corresponds to a "split accelerating mode" of the present invention.

Furthermore, at the overdrive speed (OD) in the fixed mode, the third brake B3 is engaged so that the rotor Ro1 of the first motor/generator MG1 is fixed, and also the second brake B2 is engaged so that also the rotor Ro2 of the second motor/generator MG2 is fixed. Then, the rotation speed of the input shaft I is accelerated and transmitted to the intermediate shaft M by the power distribution device P1, and then, this rotation speed of the intermediate shaft M is further accelerated and transmitted to the output shaft O by the transmission device P2. Therefore, the overdrive speed (OD) in the fixed mode corresponds to a "fixed accelerating mode" of the present invention. Note that, at the overdrive speed (OD) in the fixed mode, neither the first motor/generator MG1 nor the second motor/generator MG2 generates electric power. Therefore, when the vehicle is not provided with a separate generator and when the amount of charge of the battery 11 is reduced to a low level during driving at the overdrive speed (OD) in the fixed mode, it is preferable to control the third brake B3 to be disengaged so that switching is performed to the overdrive speed (OD) in the split mode (Sp). As a result, the first motor/generator MG1 can generate electric power.

1-6. Switching Operation from Split Mode to Fixed Mode

Next, in the hybrid drive unit H of the present embodiment, operations of various parts when the mode is switched from the split mode to the fixed mode will be described, based on timing charts shown in FIGS. 7 and 8. Both of FIGS. 7 and 8 are timing charts showing the operations of various parts when switching is performed from the high speed (Hi) in the split mode (Sp), via the overdrive speed (OD) in the split mode (Sp), to the overdrive speed (OD) in the fixed mode (Fx). Note that, when the first operation example shown in FIG. 7 and the second operation example shown in FIG. 8 are compared, the timing to stop the first motor/generator MG1 differs between them, and therefore, there is a difference in the length of time while the overdrive speed (OD) in the split mode (Sp) is held.

In the chart "OPERATION MODE AND SHIFT SPEED" of the timing charts shown in FIGS. 7 and 8, "Sp•Hi" represents the high speed in the split mode, "Sp•OD" represents the overdrive speed in the split mode, and "Fx•OD" represents the overdrive speed in the fixed mode. In addition, the charts "ROTATION SPEED," "TORQUE," and "OUTPUT POWER," indicate the values of the rotation speed, torque, and output power, respectively, of "E" for the engine, "MG1" for the first motor/generator, and "MG2" for the second motor/generator. Those values above the horizontal axis are positive and below the horizontal axis are negative. Moreover, in the chart "OUTPUT POWER," the area, shaded by diagonal lines, enclosed between the line for the output power of the first motor/generator MG1 or the second motor/generator MG2 and the horizontal axis indicates that the first motor/generator MG1 or the second motor/generator MG2 is generating electric power. The operation examples shown in FIGS. 7 and 8 will be described below.

First, the timing charts of the first operation example shown in FIG. 7 will be described. In this operation example, first, switching is performed from the high speed (Hi) in the split mode (Sp) to the overdrive speed (OD) in the split mode (Sp) by stopping the second motor/generator MG2. Then, at the overdrive speed (OD) in the split mode (Sp), the rotation speed of the first motor/generator MG1 is adjusted to zero and the rotor Ro1 of the first motor/generator MG1 is fixed so that the switching operation to the overdrive speed (OD) in the fixed mode (Fx) is performed. In this example, as shown in FIG. 7, the first motor/generator MG1 performs power running at a negative rotation speed and a negative torque, while the second motor/generator MG2 performs electric power generation at a positive rotation speed and a negative torque at the high speed (Hi) in the split mode (Sp). This state corresponds to what is called a power circulation state which is caused by swapping of roles between the first motor/generator MG1 and the second motor/generator MG2 because the vehicle speed is high (the rotation speed of the output shaft O is high).

Then, a control is performed to disengage the first clutch C1 and to make the rotation speed of the second motor/generator MG2 zero, and the rotor Ro2 is fixed to the case Dc by the second brake B2. As a result, switching to the overdrive speed (OD) in the split mode (Sp) is accomplished. At this time, when the rotation speed of the second motor/generator MG2 is made zero while the rotation speed of the output shaft O is kept constant, the rotation speed of the intermediate shaft M is reduced (refer to FIG. 6). At this time, moreover, if the rotation speed of the engine E (the input shaft I) is kept constant, the rotation speed of the first motor/generator MG1 is increased. Therefore, in this example, the rotation speed of the first motor/generator MG1 is increased from negative to positive. On the other hand, because the torque of the first motor/generator MG1 is kept at a negative constant torque, the first motor/generator MG1 generates electric power of an amount depending on the rotation speed, at the overdrive speed (OD) in the split mode (Sp).

In addition, at the overdrive speed (OD) in the split mode (Sp), the speeds of the engine E and the first motor/generator MG1 are reduced until the rotation speed of the first motor/generator MG1 becomes zero, while the rotation speed of the intermediate shaft M is kept constant. Then, after the rotation speed of first motor/generator MG1 has become zero, the rotor Ro1 is fixed to the case Dc by the third brake B3. As a result, switching to the overdrive speed (OD) in the fixed mode (Fx) is accomplished. At the overdrive speed (OD) in the fixed mode (Fx), the rotation speed of the engine E (the input shaft I) is accelerated through the power distribution device P1, the intermediate shaft M, and the transmission device P2, and is then transmitted to the output shaft O, while both the rotor Ro1 of the first motor/generator MG1 and the rotor Ro2 of the second motor/generator MG2 are kept fixed.

Next, the timing charts of the second operation example shown in FIG. 8 will be described. In this operation example, the rotor Ro2 of the second motor/generator MG2 is fixed at a particular point where, when the rotation speed of the rotor Ro2 of the second motor/generator MG2 is made zero, the rotation speed of the rotor Ro1 of the first motor/generator MG1 also becomes zero. As a result, the first motor/generator MG1 and the second motor/generator MG2 can be stopped almost at the same time, and thus a switching operation from the high speed (Hi) in the split mode (Sp), via the overdrive speed (OD) in the split mode (Sp) of very short duration, to the overdrive speed (OD) in the fixed mode (Fx) is performed. Here, the particular point is a point where the rotation speed of the rotor Ro1 of the first motor/generator MG1 becomes zero, when the rotation speed of the rotor Ro2 of the second motor/generator MG2 is made zero at the high speed (Hi) in the split mode (Sp), to perform switching to the overdrive speed (OD) in the split mode (Sp), and the point is determined from the relation between the rotation speed of the input shaft I (the engine E) and the rotation speed of the output shaft O. In other words, in order to perform a switching from the high speed (Hi) to the overdrive speed (OD) in the split mode (Sp) at the particular point as described above, the switching must be performed after adjusting the rotation speed of the engine E (the input shaft I) in accordance with the particular point, when the rotation speed of the output shaft O (the vehicle speed) is kept constant. On the other hand, when the rotation speed of the engine E (the input shaft I) is kept constant, the switching must be performed when the rotation speed of the output shaft O (the vehicle speed) reaches a particular value.

In this example, in the same way as in the first operation example shown in FIG. 7, the first motor/generator MG1 performs power running at a negative rotation speed and a negative torque while the second motor/generator MG2 performs electric power generation at a positive rotation speed and a negative torque, at the high speed (Hi) in the split mode (Sp). This state corresponds to a state in which what is called a power circulation state occurs, as described above. Then, the first clutch C1 is disengaged at a particular point where, when the rotation speed of the rotor Ro2 of the second motor/generator MG2 is made zero, the rotation speed of the rotor Ro1 of the first motor/generator MG1 also becomes zero. Next, as shown in FIG. 8, a control is performed to make the rotation speed of the second motor/generator MG2 zero, and the rotor Ro2 is fixed to the case Dc by the second brake B2. As a result, switching to the overdrive speed (OD) in the split mode (Sp) is accomplished.

At this time, the rotation speed of the rotor Ro1 of the first motor/generator MG1 becomes zero because this switching is performed at the particular point. Then, via the overdrive speed (OD) in the split mode (Sp) of very short duration, the rotor Ro1 is fixed to the case Dc by the third brake B3. As a result, switching to the overdrive speed (OD) in the fixed mode (Fx) is accomplished. At the overdrive speed (OD) in the split mode (Sp) before the rotor Ro1 is fixed to the case Dc by the third brake B3, the first motor/generator MG1 is generating a negative torque. Then, at the overdrive speed (OD) in the fixed mode (Fx), in the same way as in the first operation example shown in FIG. 7, the rotation speed of the engine E (the input shaft I) is accelerated through the power distribution device P1, the intermediate shaft M, and the transmission device P2, and is then transmitted to the output shaft O, while both the rotor Ro1 of the first motor/generator MG1 and the rotor Ro2 of the second motor/generator MG2 are kept fixed.

2. Second Embodiment

Figure 9:
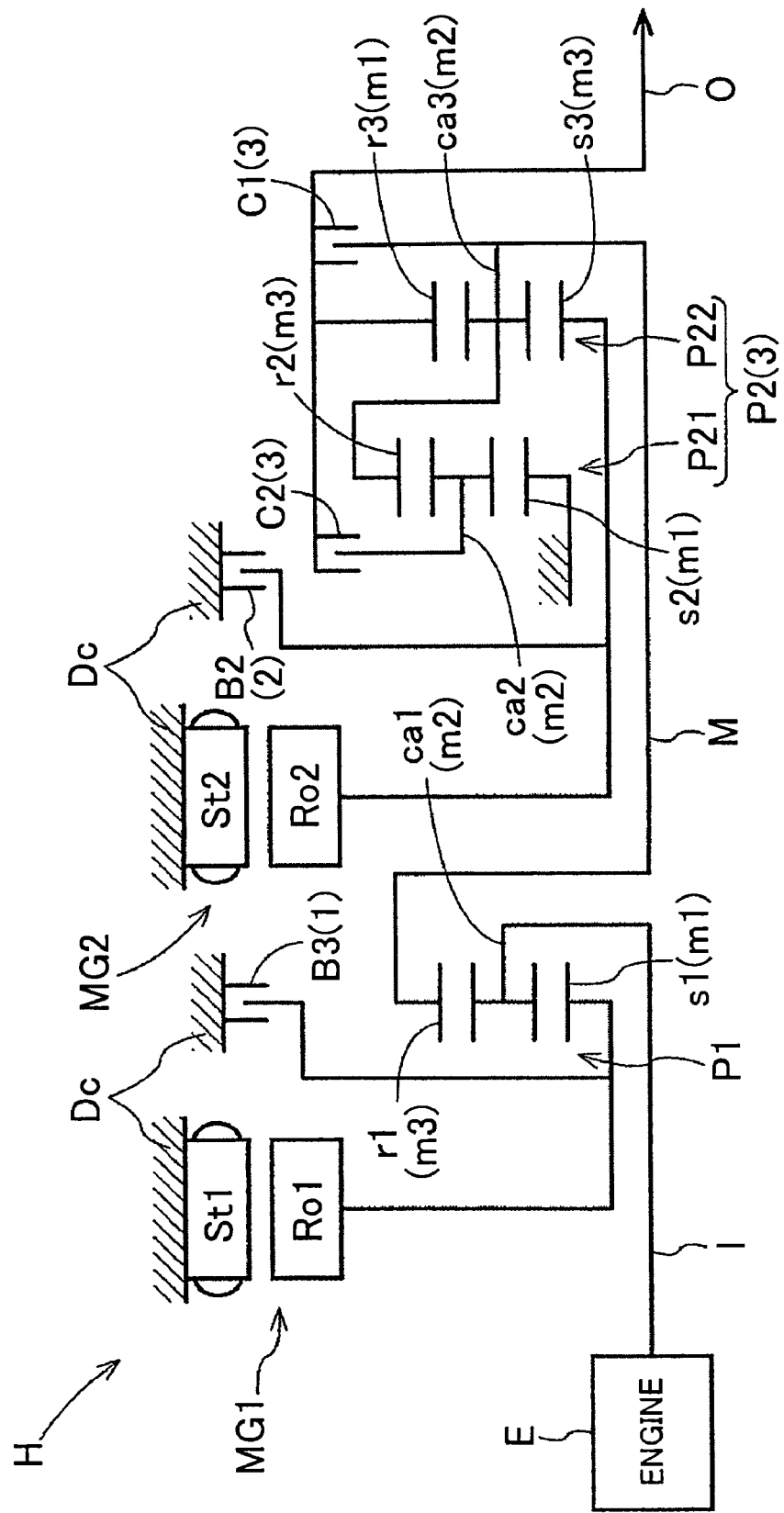
FIG. 9 is a skeleton diagram showing a hybrid drive unit according to a second embodiment of the present invention.

Next, a second embodiment of the present invention will be described. FIG. 9 is a skeleton diagram showing a mechanical structure of a hybrid drive unit H of the present embodiment. Note that the lower half of the structure, which is symmetrical with respect to the central axis, is omitted in FIG. 9, in the same way as in FIG. 1. The hybrid drive unit H of the present embodiment is different from the hybrid drive unit H of the above-described first embodiment, mainly in the structure of the transmission device P2. The other structures are the same as those in the above-described first embodiment. In the description below, the present invention will be described with respect to the difference of the hybrid drive unit H of the present embodiment from that of the above-described first embodiment. Note that details are the same as those in the first embodiment unless otherwise described.

2-1. Mechanical Structure of Hybrid Drive Unit H

As shown in FIG. 9, in the same way as in the above-described first embodiment, the hybrid drive unit H of the present embodiment also includes an input shaft I connected to an engine E, an output shaft O connected to wheels W, a first motor/generator MG1, a second motor/generator MG2, a power distribution device P1 for distributing a rotational driving force of the input shaft I to the output shaft O and to the first motor/generator MG1, and a transmission device P2 disposed between the second motor/generator MG2 and the output shaft O. These components are also housed in a case Dc as a non-rotating member which is fixed to a vehicle body. However, in the hybrid drive unit H of the present embodiment, the transmission device P2 and structural points of friction engagement elements of the transmission device P2 are different from those of the above-described first embodiment.

The transmission device P2 of the present embodiment is structured so as to have a first planetary gear set P21 that is composed of a planetary gear mechanism of a single pinion type that is arranged coaxially with the input shaft I, and to have also a second planetary gear set P22 that is likewise composed of a planetary gear mechanism of a single pinion type that is arranged coaxially with the input shaft I.

The first planetary gear set P21 has, as rotation elements, a carrier ca2 that supports a plurality of pinion gears, as well as a sun gear s2 and a ring gear r2 that respectively mesh with the pinion gears. The sun gear s2 is fixed to the case Dc as a non-rotating member. The carrier ca2 is selectively connected to the output shaft O and a ring gear r3 of the second planetary gear set P22 by a second clutch C2. The ring gear r2 is connected to rotate integrally with a carrier ca3 of the second planetary gear set P22, and through the carrier ca3 and an intermediate shaft M, it is also connected to rotate integrally with a ring gear r1, which is the output rotation element of the power distribution device P1. In the present embodiment, the sun gear s2, the carrier ca2, and the ring gear r2 respectively correspond to a "first rotation element m1," a "second rotation element m2," and a "third rotation element m3" of the first planetary gear set P21 composing the transmission device P2 of the present invention.

The second planetary gear set P22 has, as rotation elements, the carrier ca3 that supports a plurality of pinion gears, as well as a sun gear s3 and the ring gear r3 that respectively mesh with the pinion gears. The ring gear r3 is connected to rotate integrally with the output shaft O, and also selectively connected to the carrier ca2 of the first planetary gear set P21 by the second clutch C2. The carrier ca3 is connected to rotate integrally with the ring gear r2 of the first planetary gear set P21, and through the intermediate shaft M, it is also connected to rotate integrally with the ring gear r1, which is the output rotation element of the power distribution device P1. The sun gear s3 is connected to rotate integrally with a rotor Ro2 of the second motor/generator MG2, and selectively fixed to the case Dc by a second brake B2. In the present embodiment, the ring gear r3, the carrier ca3, and the sun gear s3 respectively correspond to a "first rotation element m1," a "second rotation element m2," and a "third rotation element m3" of the second planetary gear set P22 composing the transmission device P2 of the present invention. In addition, also in the present embodiment, because the rotor Ro2 of the second motor/generator MG2 can be selectively fixed to the case Dc by the second brake B2 in the same way as in the above-described first embodiment, the second brake B2 forms the "second rotary electric machine fixing device 2" of the present invention.

In addition, in the transmission device P2, the ring gear r2 of the first planetary gear set P21 and the carrier ca3 of the second planetary gear set P22, which are connected to rotate integrally with each other, are selectively connected to the ring gear r3 of the second planetary gear set P22 by a first clutch C1. Therefore, the intermediate shaft M, which is connected to the carrier ca3 of the second planetary gear set P22, and the ring gear r1, which is the output rotation element of the power distribution device P1, are selectively connected by the first clutch C1 with the output shaft O, which is connected to the ring gear r3 of the transmission device P2. In other words, in the engagement state of the first clutch C1, the ring gear r1 of the power distribution device P1 is connected to rotate integrally with the output shaft O. In addition, in the engagement state of the first clutch C1 as described above, the second planetary gear set P22 is brought into a directly connected state in which all of the rotation elements s3, ca3, and r3 rotates integrally. On the other hand, in the disengagement state of the first clutch C1, the ring gear r1 of the power distribution device P1 is connected to the output shaft O through the transmission device P2.

As described above, the second motor/generator MG2 is connected to rotate integrally with the sun gear s3 of the second planetary gear set P22, and the output shaft O is connected to rotate integrally with the ring gear r3 of the second planetary gear set P22. Therefore, the second motor/generator MG2 is connected to the output shaft through the transmission device P2, more specifically, through the sun gear s3, the carrier ca3, and the ring gear r3 of the second planetary gear set P22. In the transmission device P2, when both the first clutch C1 and the second clutch C2 are disengaged, and the rotor Ro2 of the second motor/generator MG2 is fixed to the case Dc by the second brake B2, rotation is transmitted between the intermediate shaft M and the output shaft O through the carrier ca3 and the ring gear r3 of the second planetary gear set P22, but that rotation is not transmitted to the sun gear s3 of the second planetary gear set P22. Therefore, the transmission device P2 is structured so as to be able to cut off the transmission of the rotation between the output shaft O and the second motor/generator MG2 by disengaging the first clutch C1 and the second clutch C2, under the state in which the rotor Ro2 of the second motor/generator MG2 is fixed by the second brake B2. In addition, under such a state in which the first clutch C1 and the second clutch C2 are disengaged, and the rotor Ro2 of the second motor/generator MG2 and the sun gear s3 are fixed to the case Dc by the second brake B2, the transmission device P2 is structured such that the rotation speed of the carrier ca3 (the intermediate shaft M) is accelerated and transmitted to the output shaft O. Therefore, the transmission device P2 is structured such that the rotation speed of the ring gear r1, which is the output rotation element of the power distribution device P1, is accelerated and transmitted to the output shaft O. Consequently, in the present embodiment, the first clutch C1, the second clutch C2, and the transmission device P2 form the "transmission cutoff device 3" of the present invention.

As described above, this hybrid drive unit H includes, as friction engagement elements, the first clutch C1, the second clutch C2, the second brake B2, and the third brake B3. As these friction engagement elements, multi-plate clutches and multi-plate brakes, both of which are hydraulically operated, can be used. Note that the system structure of the hybrid drive unit H of the present embodiment is the same as that shown in FIG. 2. Therefore, these friction engagement elements C1, C2, B2, and B3 are controlled by the hydraulic control unit 13 which operates by control commands from the control unit ECU, in the same way as in the above-described first embodiment.

2-2. Operation Modes of Hybrid Drive Unit H

Next, the operation modes that can be realized by the hybrid drive unit H of the present embodiment will be described. FIG. 10 is an operation table showing a plurality of operation modes and the operating states of the friction engagement elements C1, C2, B2, and B3 at each shift speed included in each operation mode. In this figure, "O" indicates a friction engagement element that is in an engagement state. On the other hand, "no mark" indicates a friction engagement element that is in a disengagement state. As shown in this figure, the hybrid drive unit H of the present embodiment is structured such that it can be switched between two operation modes of "split mode" and "fixed mode" in the same way as in the above-described first embodiment. This hybrid drive unit H has three shift speeds of the low speed (Lo), the high speed (Hi), and the overdrive speed (OD), in the split mode, whereas the only shift speed in the fixed mode is the overdrive speed (OD). It is also the same as in the above-described first embodiment that, at the low speed (Lo) and the high speed (Hi) in the split mode, the rotation of the rotor Ro2 of the second motor/generator MG2 is transmitted to the output shaft O through the transmission device P2, whereas at the overdrive speed (OD) in both the split mode and the fixed mode, the rotor Ro2 of the second motor/generator MG2 is fixed.

Figure 11A:
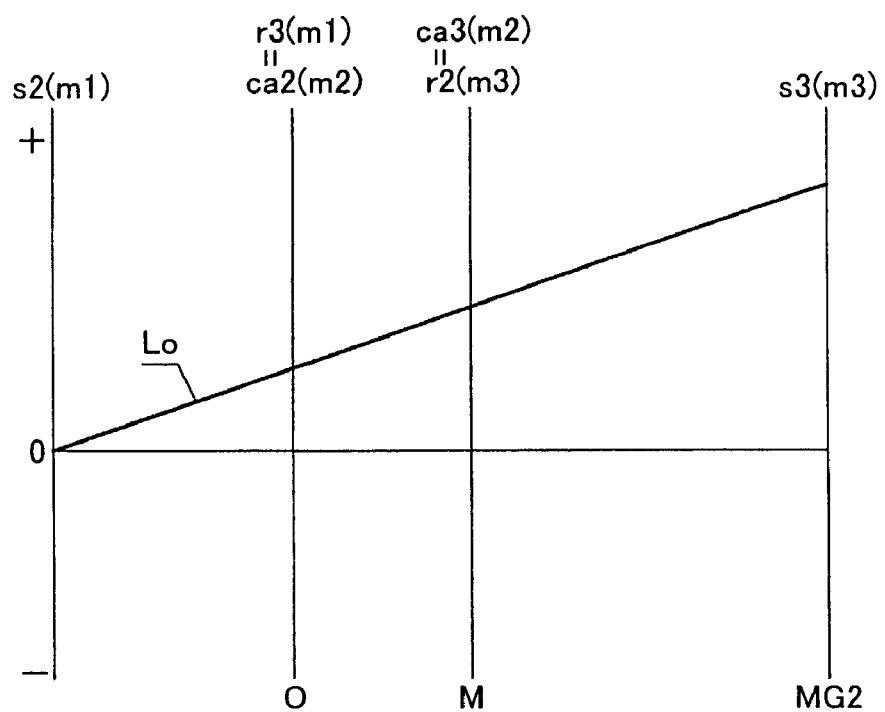
FIGS. 11A and 11B show velocity diagrams of a transmission device according to the second embodiment.
Figure 11B:
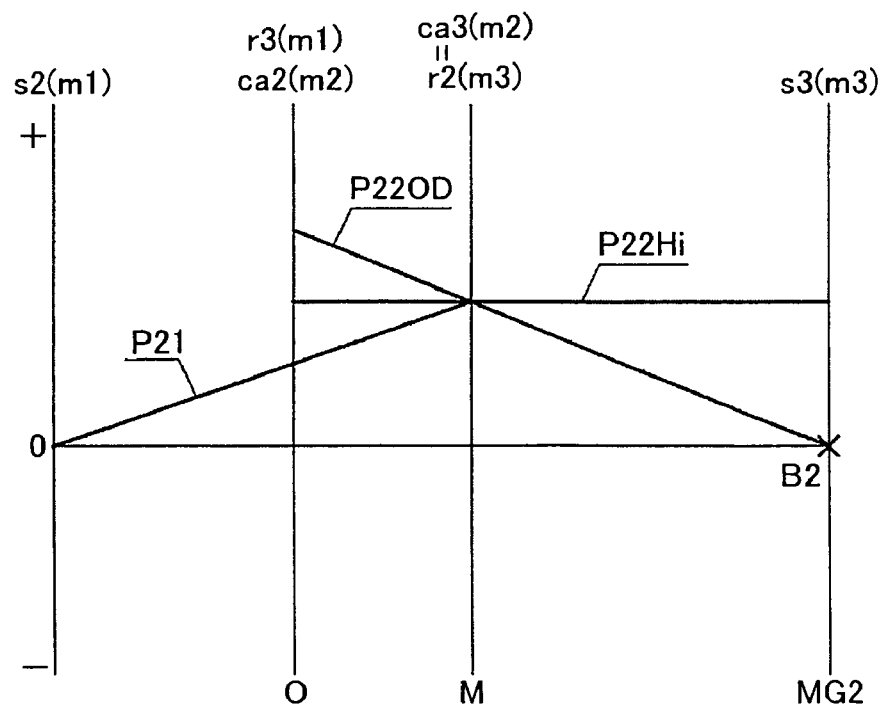

In addition, FIGS. 11A and 11B show velocity diagrams of the transmission device P2, where FIG. 11A is a velocity diagram at the low speed (Lo) in the split mode, and FIG. 11B is a velocity diagram at the high speed (Hi) in the split mode, and at the overdrive speed (OD) both in the split mode and in the fixed mode. The captions "s2," "ca2," and "r2," which are written at the top of the vertical lines in FIGS. 11A and 11B, correspond to the sun gear s2, the carrier ca2, and the ring gear r2, respectively, of the first planetary gear set P21 composing the transmission device P2, and the captions "s3," "ca3," and "r3," correspond to the sun gear s3, the carrier ca3, and the ring gear r3, respectively, of the second planetary gear set P22 composing the transmission device P2. Moreover, the spaces between the vertical lines corresponding to the rotation elements correspond to the gear ratios of the transmission device P2. Note that "MG2," "M," and "O," which are written at the bottom of the vertical lines in these velocity diagrams, respectively represent the second motor/generator MG2, the intermediate shaft M, and the output shaft O, which are connected to rotate integrally with the rotation elements represented by the respective vertical lines. In addition, the mark "X" in these velocity diagrams indicates that the brake B2 is engaged.

In addition, in FIG. 11A, the straight line Lo indicates an operating state of the transmission device P2 at the low speed (Lo). Furthermore, in FIG. 11B, the straight line P21 indicates an operating state of the first planetary gear set P21 at the high speed (Hi) and at the overdrive speed (OD), the straight line P22Hi indicates an operating state of the second planetary gear set P22 at the high speed (Hi), and the straight line P22OD indicates an operating state of the second planetary gear set P22 at the overdrive speed (OD). Note that, in the hybrid drive unit H of the present embodiment, the operating state of the power distribution device P1 in each operation mode of "split mode" and "fixed mode" is the same as in the above-described first embodiment. Accordingly, in the description below, operating states of the transmission device P2 will be described in detail.

2-3. Operating States of Transmission Device

As shown in FIGS. 11A and 11B, the transmission device P2 is brought into different operating states depending on which of the low speed (Lo), the high speed (Hi), and the overdrive speed (OD), its shift speed is switched. On the other hand, the transmission device P2 is brought, unlike the power distribution device P1, into the same operating state in both the split mode and the fixed mode (both at the overdrive speed (OD)). When the transmission device P2 is operating at the low speed (Lo), the second clutch C2 is engaged, and thus the carrier ca2 of the first planetary gear set P21, the ring gear r3 of the second planetary gear set P22, and the output shaft O are connected to rotate integrally with each other. As a result, the first planetary gear set P21 and the second planetary gear set P22, which compose the transmission device P2, integrally operate as a four-element planetary gear set having four rotation elements, and thus the straight line representing the first planetary gear set P21 (corresponding to the line P21 in FIG. 11B) and the straight lines representing the second planetary gear set P22 (corresponding to the lines P22Hi and P22OD in FIG. 11B) form the same straight line on the velocity diagram, as indicated by the straight line Lo in FIG. 11A. Moreover, because the sun gear s2 of the first planetary gear set P21 is fixed to the case Dc, the rotation speed of the intermediate shaft M is decelerated and transmitted to the output shaft O, and also the rotation speed of the second motor/generator MG2 is decelerated and transmitted to the output shaft O. Note that the operating state of the transmission device P2 at the low speed (Lo) is the same as in the above-described first embodiment.

In addition, when the transmission device P2 is operating at the high speed (Hi), the first clutch C1 is engaged, resulting in a directly connected state in which the whole of the second planetary gear set P22 rotates integrally. As a result, the rotation speed of the intermediate shaft M and the second motor/generator MG2 is transmitted to the output shaft O without change, as indicated by the straight line P22Hi in FIG. 11B. At this time, because the second clutch C2 is disengaged, the first planetary gear set P21, except the ring gear r2 which is connected to rotate integrally with the carrier ca3, operates independently of the second planetary gear set P22, as indicated by the straight line P21 in FIG. 11B.

Therefore, in the same way as in the above-described first embodiment, at the low speed (Lo) and the high speed (Hi), the torque of the second motor/generator MG2 after a speed change (deceleration or no change) at a predetermined gear ratio through the second motor/generator MG, and the torque of the engine E (the input shaft I) distributed from the power distribution device P1 to the intermediate shaft M are summed and output from the output shaft O. In other words, at the low speed (Lo) and the high speed (Hi) in the split mode, if the rotational driving force that is transmitted form the intermediate shaft M to the output shaft O through the transmission device P2 falls short of the requested driving force, the second motor/generator MG2 is made to perform power running. In this way, the vehicle can be driven with the rotational driving force of the engine E assisted by the rotational driving force of the second motor/generator MG2.

In addition, when the transmission device P2 is operating at the overdrive speed (OD), the second brake B2 is engaged, and thus the sun gear s3 of the second planetary gear set P22 is fixed to the case Dc. As a result, the rotor Ro2 of the second motor/generator MG2 is also fixed to the case Dc, and its rotation speed becomes zero, as indicated by the straight line P22OD in FIG. 11B. At this time, the rotation speed of the intermediate shaft M is accelerated depending on the gear ratio of the transmission device P2, and transmitted to the output shaft O. Because the rotor Ro2 of the second motor/generator MG2 is fixed to the case Dc at the overdrive speed (OD) as described above, only the torque of the engine E (the input shaft I) that is distributed from the power distribution device P1 to the intermediate shaft M is transmitted to the output shaft O. At this time, because the second clutch C2 is disengaged, the first planetary gear set P21, except the ring gear r2 which is connected to rotate integrally with the carrier ca3, operates independently of the second planetary gear set P22, in the same way as at the high speed (Hi), as indicated by the straight line P21 in FIG. 11B. Note that the operating state of the transmission device P2 at the overdrive speed (OD) is common in both the split mode and the fixed mode.

As described above, in the same way as in the above-described first embodiment, also in the present embodiment, the low speed (Lo) and the high speed (Hi) in the split mode correspond to the "split normal mode" of the present invention, the overdrive speed (OD) in the split mode corresponds to the "split accelerating mode" of the present invention, and the overdrive speed (OD) in the fixed mode corresponds to the "fixed accelerating mode" of the present invention. Note that the operations of various parts during mode switching from the split mode to the fixed mode in the hybrid drive unit H of the present embodiment can be explained in the same way as in the above-described first embodiment, based on the timing charts in FIGS. 7 and 8.

3. Third Embodiment

Figure 12:
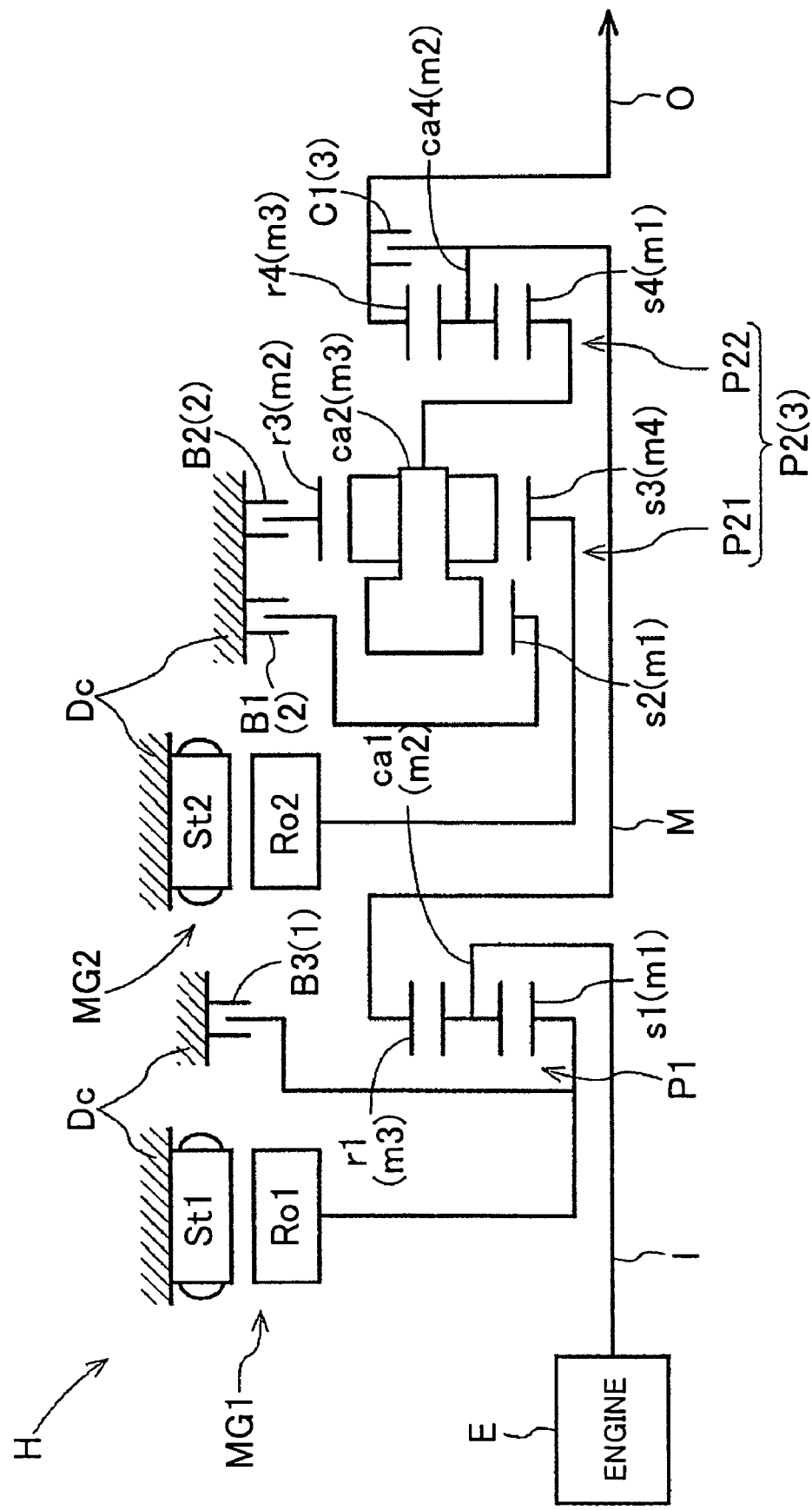
FIG. 12 is a skeleton diagram showing a hybrid drive unit according to a third embodiment of the present invention.

Next, a third embodiment of the present invention will be described. FIG. 12 is a skeleton diagram showing a mechanical structure of a hybrid drive unit H of the present embodiment. Note that the lower half of the structure, which is symmetrical with respect to the central axis, is omitted in FIG. 12, in the same way as in FIGS. 1 and 9. The hybrid drive unit H of the present embodiment is different from the hybrid drive unit H of the above-described first embodiment, mainly in the structure of the transmission device P2. The other structures are the same as those in the above-described first embodiment. In the description below, the present invention will be described with respect to the difference of the hybrid drive unit H of the present embodiment from that of the above-described first embodiment. Note that details are the same as those in the first embodiment unless otherwise described.

3-1. Mechanical Structure of Hybrid Drive Unit H

As shown in FIG. 12, in the same way as in the above-described first embodiment, the hybrid drive unit H of the present embodiment also includes an input shaft I connected to an engine E, an output shaft O connected to wheels W, a first motor/generator MG1, a second motor/generator MG2, a power distribution device P1 for distributing a rotational driving force of the input shaft I to the output shaft O and to the first motor/generator MG1, and a transmission device P2 disposed between the second motor/generator MG2 and the output shaft O. These components are also housed in a case Dc as a non-rotating member which is fixed to a vehicle body. However, in the hybrid drive unit H of the present embodiment, the transmission device P2 and structural points of friction engagement elements of the transmission device P2 are different from those of the above-described first embodiment.

The transmission device P2 of the present embodiment is structured so as to have a first planetary gear set P21 that is composed of a four-element planetary gear set having four rotation elements that is arranged coaxially with the input shaft I, and to have also a second planetary gear set P22 that is composed of a planetary gear mechanism of a single pinion type that is likewise arranged coaxially with the input shaft I.

The first planetary gear set P21 has, as rotation elements, two sun gears, i.e., a first sun gear s2 and a second sun gear s3, a ring gear r3, and a carrier ca2. Here, the carrier ca2 is structured so as to rotatably support both a short pinion gear that meshes with both the second sun gear s3 and the ring gear r3, and a stepped long pinion gear whose large diameter portion meshes with the first sun gear s2 and whose small diameter portion meshes with the short pinion gear. The first sun gear s2 is selectively fixed to the case Dc by a first brake B1. The ring gear r3 is selectively fixed to the case Dc by a second brake B2. The carrier ca2 is connected to rotate integrally with a sun gear s4 of the second planetary gear set P22. The second sun gear s3 is connected to rotate integrally with the rotor Ro2 of the second motor/generator MG2. In the present embodiment, the first sun gear s2, the ring gear r3, the carrier ca2, and the second sun gear s3 respectively correspond to the "first rotation element m1," the "second rotation element m2," the "third rotation element m3," and the "fourth rotation element m4" of the transmission device P2 of the present invention. In addition, in the present embodiment, by engaging both the first brake B1 and the second brake B2, the whole of the first planetary gear set P21 including the second sun gear s3, to which the rotor Ro2 of the second motor/generator MG2 is connected, can be fixed to the case Dc. Accordingly, the first brake B1 and the second brake B2 form the "second rotary electric machine fixing device 2" of the present invention.

The second planetary gear set P22 has, as rotation elements, a carrier ca4 that supports a plurality of pinion gears, as well as the sun gear s4 and a ring gear r4 that respectively mesh with the pinion gears. The ring gear r4 is connected to rotate integrally with the output shaft O. The carrier ca4 is connected, through the intermediate shaft M, to rotate integrally with the ring gear r1, which is the output rotation element of the power distribution device P1. The sun gear s4 is connected to rotate integrally with the carrier ca2 of the first planetary gear set P21. In the present embodiment, the sun gear s4, the carrier ca4, and the ring gear r4 respectively correspond to the "first rotation element m1," the "second rotation element m2," and the "third rotation element m3" of the second planetary gear set P22 composing the transmission device P2 of the present invention.

In addition, the carrier ca4 and the ring gear r4 of the second planetary gear set P22, which composes the transmission device P2, are selectively connected to each other by a first clutch C1. Therefore, the intermediate shaft M, which is connected to the carrier ca4 of the second planetary gear set P22, and the ring gear r1, which is the output rotation element of the power distribution device P1, are selectively connected by the first clutch C1 with the output shaft O, which is connected to the ring gear r4 of the second planetary gear set P22. In other words, in the engagement state of the first clutch C1, the ring gear r1 of the power distribution device P1 is connected to rotate integrally with the output shaft O. In addition, in the engagement state of the first clutch C1 as described above, the second planetary gear set P22 is brought into a directly connected state in which all of the rotation elements s4, ca4, and r4 rotate integrally. On the other hand, in the disengagement state of the first clutch C1, the ring gear r1 of the power distribution device P1 is connected to the output shaft O, through the transmission device P2.

As described above, the second motor/generator MG2 is connected to rotate integrally with the second sun gear s3 of the first planetary gear set P21, and the output shaft is connected to rotate integrally with the ring gear r4 of the second planetary gear set P22. Therefore, the second motor/generator MG2 is connected to the output shaft O through the transmission device P2, more specifically, through the second sun gear s3 and the carrier ca2 of the first planetary gear set P21, and through the second planetary gear set P22. In the transmission device P2, when the first clutch C1 is disengaged, and the rotor Ro2 of the second motor/generator MG2 is fixed to the case Dc by engaging both the first brake B1 and the second brake B2, rotation is transmitted between the intermediate shaft M and the output shaft O through the carrier ca4 and the ring gear r4 of the second planetary gear set P22, but that rotation is not transmitted to the first planetary gear set P21. Therefore, the transmission device P2 is structured so as to be able to cut off the transmission of the rotation between the output shaft O and the second motor/generator MG2 by disengaging the first clutch C1, under the state in which the rotor Ro2 of the second motor/generator MG2 is fixed by the first brake B1 and the second brake B2. In addition, under such a state in which the first clutch C1 is disengaged, and the first planetary gear set P21 and the rotor Ro2 of the second motor/generator MG2 are fixed to the case Dc by the first brake B1 and the second brake B2, the second planetary gear set P22 of the transmission device P2 is structured such that the rotation speed of the carrier ca4 (the intermediate shaft M) is accelerated and transmitted to the output shaft O. Therefore, the transmission device P2 is structured such that the rotation speed of the ring gear r1, which is the output rotation element of the power distribution device P1, is accelerated and transmitted to the output shaft O. Consequently, in the present embodiment, the first clutch C1 and the transmission device P2 form the "transmission cutoff device 3" of the present invention.

As described above, this hybrid drive unit H includes, as friction engagement elements, the first clutch C1, the first brake B1, the second brake B2, and the third brake B3. As these friction engagement elements, multi-plate clutches and multi-plate brakes, both of which are hydraulically operated, can be used. Note that the system structure of the hybrid drive unit H of the present embodiment is the same as that shown in FIG. 2. Therefore, these friction engagement elements C1, B1, B2, and B3 are controlled by the hydraulic control unit 13 which operates by control commands from the control unit ECU, in the same way as in the above-described first embodiment.

3-2. Operation Modes of Hybrid Drive Unit H

Next, the operation modes that can be realized by the hybrid drive unit H of the present embodiment will be described. FIG. 13 is an operation table showing a plurality of operation modes and the operating states of the friction engagement elements C1, B1, B2, and B3 at each shift speed included in each operation mode. In this figure, "O" indicates a friction engagement element that is in an engagement state. On the other hand, "no mark" indicates a friction engagement element that is in a disengagement state. As shown in this figure, the hybrid drive unit H of the present embodiment is structured such that it can be switched between two operation modes of "split mode" and "fixed mode" in the same way as in the above-described first embodiment. This hybrid drive unit H has three shift speeds of the low speed (Lo), the high speed (Hi), and the overdrive speed (OD), in the split mode, whereas the only shift speed in the fixed mode is the overdrive speed (OD). It is also the same as in the above-described first embodiment that, at the low speed (Lo) and the high speed (Hi) in the split mode, the rotation of the rotor Ro2 of the second motor/generator MG2 is transmitted to the output shaft O through the transmission device P2, whereas at the overdrive speed (OD) in both the split mode and the fixed mode, the rotor Ro2 of the second motor/generator MG2 is fixed.

In addition, FIGS. 14A and 14B show velocity diagrams of the transmission device P2, where FIG. 14A is a velocity diagram of the first planetary gear set P21, and FIG. 14B is a velocity diagram of the second planetary gear set P22. The captions "s2," "r3," "ca2," and "s3," which are written at the top of the vertical lines in FIG. 14A, correspond to the first sun gear s2, the ring gear r3, the carrier ca2, and the second sun gear s3, respectively, of the first planetary gear set P21 composing the transmission device P2. The captions "s4," "ca4," and "r4," which are written at the top of the vertical lines in FIG. 14B, correspond to the sun gear s4, the carrier ca4, and the ring gear r4, respectively, of the second planetary gear set P22 composing the transmission device P2. Moreover, the spaces between the vertical lines corresponding to the rotation elements correspond to the gear ratios of the first planetary gear set P21 and the second planetary gear set P22. Note that "MG2," "M," and "O," which are written at the bottom of the vertical lines in these velocity diagrams, respectively represent the second motor/generator MG2, the intermediate shaft M, and the output shaft O, which are connected to rotate integrally with the rotation elements represented by the respective vertical lines. In addition, the mark "X" in these velocity diagrams indicates that the brake B1 or the brake B2 is engaged.

In addition, in FIGS. 14A and 14B, the straight line Lo, the straight line Hi, or the straight line OD indicates the operating state at the low speed (Lo), at the high speed (Hi), or at the overdrive speed (OD), respectively, of the first planetary gear set P21 or the second planetary gear set P22. Note that, in the hybrid drive unit H of the present embodiment, the operating state of the power distribution device P1 in each operation mode of "split mode" and "fixed mode" is the same as in the above-described first embodiment. Accordingly, in the description below, operating states of the transmission device P2 will be described in detail.

3-3. Operating States of Transmission Device

As shown in FIG. 14, the transmission device P2 assumes different operating states depending on to which of the low speed (Lo), the high speed (Hi), and the overdrive speed (OD), its shift speed is switched. On the other hand, the transmission device P2 assumes, unlike the power distribution device P1, the same operating state in both the split mode and the fixed mode (both at the overdrive speed (OD)). At the low speed (Lo), the second brake B2 is engaged, and thus the ring gear r3 of the first planetary gear set P21 is fixed to the case Dc. As a result, the rotation speed of the rotor Ro2 of the second motor/generator MG2 is decelerated and transmitted to the carrier ca2 of the first planetary gear set P21, as indicated by the straight line Lo in FIG. 14A. At this time, because the first clutch C1 is in an engagement state, the second planetary gear set P22 is in a directly connected state in which all of the rotation elements s4, ca4, and r4 rotates integrally, as indicated by the straight line Lo-Hi in FIG. 14B. Here, because the carrier ca2 of the first planetary gear set P21 is connected to rotate integrally with the sun gear s4 of the second planetary gear set P22, the decelerated rotation of the rotor Ro2 of the second motor/generator MG2 is transmitted also to the sun gear s4 of the second planetary gear set P22. Therefore, at the low speed (Lo), the rotation speed of the intermediate shaft M is transmitted to the output shaft O without change, and the rotation speed of the second motor/generator MG2 is decelerated and transmitted to the output shaft O.

In addition, at the high speed (Hi), the first brake B1 is engaged, and thus the first sun gear s2 of the first planetary gear set P21 is fixed to the case Dc. As a result, as indicated by the straight line Hi in FIG. 14A, the rotation speed of the rotor Ro2 of the second motor/generator MG2 is decelerated and transmitted to the carrier ca2 of the first planetary gear set P21. Note that the speed reduction ratio of the second motor/generator MG2 at the high speed (Hi) is smaller than the speed reduction ratio at the low speed (Lo). Moreover, because the first clutch C1 is in an engagement state at this time, the second planetary gear set P22 is in a directly connected state in which all of the rotation elements s4, ca4, and r4 rotate integrally, as indicated by the straight line Lo•Hi in FIG. 14B. Here, because the carrier ca2 of the first planetary gear set P21 is connected to rotate integrally with the sun gear s4 of the second planetary gear set P22, the decelerated rotation of the rotor Ro2 of the second motor/generator MG2 is transmitted also to the sun gear s4 of the second planetary gear set P22. Therefore, at the high speed (Hi), the rotation speed of the intermediate shaft M is transmitted to the output shaft O without change, and the rotation speed of the second motor/generator MG2 is decelerated at a speed reduction ratio smaller than the ratio of the low speed (Lo), and transmitted to the output shaft O.

Therefore, in the same way as in the above-described first embodiment, at the low speed (Lo) and the high speed (Hi), the torque of the second motor/generator MG2 after a speed change (deceleration) at a predetermined gear ratio through the second motor/generator MG2, and the torque of the engine E (the input shaft I) distributed from the power distribution device P1 to the intermediate shaft M are summed and output from the output shaft O. In other words, at the low speed (Lo) and the high speed (Hi) in the split mode, if the rotational driving force that is transmitted from the intermediate shaft M to the output shaft O through the transmission device P2 falls short of the requested driving force, the second motor/generator MG2 is made to perform power running. In this way, the vehicle can be driven with the rotational driving force of the engine E assisted by the rotational driving force of the second motor/generator MG2.

In addition, at the overdrive speed (OD), both the first brake B1 and the second brake B2 are engaged, and thus the whole of the first planetary gear set P21 is fixed to the case Dc. In other words, at the overdrive speed (OD), as indicated by the straight line OD in FIG. 14A, the rotation speeds of all of the rotation elements s2, r3, ca2, and s3 of the first planetary gear set P21 become zero. As a result, the rotor Ro2 of the second motor/generator MG2 is also fixed to the case Dc, and its rotation speed becomes zero. In addition, the rotation speed of the sun gear s4, which is connected to rotate integrally with the carrier ca2 of the first planetary gear set P21, of the second planetary gear set P22 also becomes zero. Moreover, because the first clutch C1 is in a disengagement state at this time, the rotation speed of the intermediate shaft M is accelerated depending on the gear ratio of the second planetary gear set P22, and transmitted to the output shaft O, as indicated by the straight line OD in FIG. 14B. Because the rotor Ro2 of the second motor/generator MG2 is fixed to the case Dc at the overdrive speed (OD) as described above, only the torque of the engine E (the input shaft I) that is distributed from the power distribution device P1 to the intermediate shaft M is transmitted to the output shaft O. Note that the operating state of the transmission device P2 at the overdrive speed (OD) is common in both the split mode and the fixed mode.

As described above, in the same way as in the above-described first embodiment, also in the present embodiment, the low speed (Lo) and the high speed (Hi) in the split mode correspond to the "split normal mode" of the present invention, the overdrive speed (OD) in the split mode corresponds to the "split accelerating mode" of the present invention, and the overdrive speed (OD) in the fixed mode corresponds to the "fixed accelerating mode" of the present invention. Note that the operations of various parts during mode switching from the split mode to the fixed mode in the hybrid drive unit H of the present embodiment can be explained in the same way as in the above-described first embodiment, based on the timing charts in FIGS. 7 and 8.

4. Other Embodiments (1) In the above-described embodiments, explanation has been given of examples in which the second motor/generator MG2 is structured so as to be connected to the output shaft O through the transmission device P2. However, embodiments of the present invention are not limited to these examples. Specifically, it is also possible to have a structure in which the hybrid drive unit H does not include the transmission device P2 and the second motor/generator MG2 is directly connected to the output shaft O. In this case, it is also a preferable embodiment of the present invention to provide a structure that includes, as the transmission cutoff device 3 for enabling cutting off the transmission of rotation between the output shaft O and the second motor/generator MG2, a clutch for selectively connecting the rotor Ro2 of the second motor/generator MG2 with the output shaft O, at least in the state that the rotor Ro2 of the second motor/generator MG2 is fixed. Note that, in this case also, it is possible to have a structure that includes, as the second rotary electric machine fixing device 2 for selectively fixing the rotor Ro2 of the second motor/generator MG2, a brake similar to the second brake B2 in the above-described first and second embodiments.

(2) In the above-described embodiments, explanation has been given of examples in which the rotation speed of the output rotation element of the power distribution device P1 is accelerated by the transmission device P2, and then transmitted to the output shaft O, in the state that the rotor Ro2 of the second motor/generator MG2 is fixed. However, embodiments of the present invention are not limited to these examples. Specifically, it is also a preferable embodiment of the present invention to provide a structure in which, in the state that the rotor Ro2 of the second motor/generator MG2 is fixed, the rotation speed of the output rotation element of the power distribution device P1 is transmitted to the output shaft O without change, or it is decelerated by the transmission device P2 and then transmitted to the output shaft O.

(3) In the above-described embodiments, explanation has been given of examples in which the hybrid drive unit H includes the third brake B3 for fixing the rotor Ro1 of the first motor/generator MG1 to the case Dc. However, embodiments of the present invention are not limited to these examples. It is also a preferable embodiment of the present invention to provide a structure that does not include the first rotary electric machine fixing device 1 for fixing the first motor/generator MG1.

(4) In the above-described embodiments, explanation has been given of examples in which the hybrid drive unit H has three shift speeds in the split mode and one shift speed in the fixed mode. However, embodiments of the present invention are not limited to these examples. Specifically, it is also a preferable embodiment of the present invention to provide a structure that has one or two shift speeds, or has four or more shift speeds, in the split mode. It is another preferable embodiment of the present invention to provide a structure that has two or more shift speeds in the fixed mode.

(5) In addition, the above-described embodiments have explained mere examples of the structures of the power distribution device P1 and the transmission device P2, and also mere examples of the arrangement structures of the friction engagement elements for their rotation elements. Therefore, any structure, other than the above-described structures, that can realize a structure of the present invention is included in the scope of the present invention.

Note that in the present application, "connection" includes a structure to perform a direct transmission of rotation between two members, and also includes a structure to perform an indirect transmission of rotation through one or two or more members. In addition, in the present application, "rotary electric machine" is used as a concept that includes any one of a motor (electric rotating machine), a generator (electricity generating machine), and a motor/generator, which serves as a motor or a generator depending on necessity.

According to an exemplary aspect, the rotor of the second rotary electric machine can be fixed under a low-load driving condition such as a high-speed cruise mode in which a driving force of the second rotary electric machine is not required to be transmitted to the output shaft, and also transmission of rotation between the output shaft and the second rotary electric machine can be cut off by allowing the output shaft to rotate relatively to the fixed rotor of the second rotary electric machine. Therefore, under the low-load driving condition in which a driving force of the second rotary electric machine is not required to be transmitted to the output shaft, the drag loss and the core loss of the rotor of the second rotary electric machine can be suppressed, enabling an improvement in fuel economy of the engine.

According to an exemplary aspect, a rotation speed of the input shaft can be accelerated and transmitted to the output shaft, in the state that the rotor of the second rotary electric machine is fixed. Therefore, even under the low-load driving condition in which a driving force of the second rotary electric machine is not required to be transmitted to the output shaft and also under a high-speed driving condition, a rotation speed of the engine can be prevented from becoming excessively high, enabling a further improvement in fuel economy of the engine.

According to an exemplary aspect, there can be comparatively easily realized a structure in which, while the clutch is engaged, the rotation of the output rotation element of the power distribution device is transmitted to the output shaft without change, and also the rotation of the second rotary electric machine is transmitted to the output shaft through the transmission device, and while the clutch is released, the transmission of rotation is cut off between the output shaft and the second rotary electric machine, and also the rotation of the output rotation element of the power distribution device is accelerated through the transmission device and transmitted to the output shaft.

According to an exemplary aspect, it becomes possible to appropriately perform fixing of the rotor of the second rotary electric machine and cutoff of the transmission of rotation between the output shaft and the second rotary electric machine, by predefining, based on the rotation speed and the requested driving force of the output shaft, the low-load driving condition in which a driving force of the second rotary electric machine is not required to be transmitted to the output shaft. Therefore, the drag loss and the core loss of the rotor of the second rotary electric machine can be appropriately suppressed, enabling an improvement in fuel economy of the engine.

According to an exemplary aspect, in the state that the rotational driving force of the input shaft is not required to be distributed to the first rotary electric machine, such as when electric power generation is not required, an operation of distributing the rotational driving force of the input shaft to the output shaft and to the first rotary electric machine by the power distribution device can be stopped; thus, the state in which all of the rotational driving force of the input shaft is transmitted to the output rotation element of the power distribution device can be obtained. Therefore, in the state that the rotational driving force of the input shaft is not required to be distributed to the first rotary electric machine, the drag loss and the core loss of the rotor of the first rotary electric machine can be suppressed, enabling a further improvement in fuel economy of the engine.

Note that, in the present application, with respect to a planetary gear mechanism provided with three rotation elements of a sun gear, carrier, and ring gear, the single planetary gear mechanism or a device obtained by combining multiple planetary gear mechanisms is called "planetary gear set."

According to an exemplary aspect, the rotor of the second rotary electric machine can be selectively fixed to the non-rotating member by the second brake. In addition, in the state that the rotor of the second rotary electric machine is fixed by the second brake and when the clutch and the first brake are disengaged, the transmission device cuts off the transmission of rotation between the output shaft and the second rotary electric machine and also accelerates the rotation speed of the input shaft and transmits it to the output shaft. Therefore, under a low-load driving condition such as a high-speed cruise mode in which a driving force of the second rotary electric machine is not required to be transmitted to the output shaft, the drag loss and the core loss of the rotor of the second rotary electric machine can be suppressed by engaging the second brake and disengaging the clutch and the first brake, enabling an improvement in fuel economy of the engine.

According to an exemplary aspect, the rotor of the second rotary electric machine can be selectively fixed to the non-rotating member by the brake. In addition, in the state that the rotor of the second rotary electric machine is fixed by the brake and when the first clutch and the second clutch are disengaged, the transmission device cuts off the transmission of rotation between the output shaft and the second rotary electric machine and also accelerates the rotation speed of the input shaft and transmits it to the output shaft. Therefore, under a low-load driving condition such as a high-speed cruise mode in which a driving force of the second rotary electric machine is not required to be transmitted to the output shaft, the drag loss and the core loss of the rotor of the second rotary electric machine can be suppressed by engaging the brake and disengaging the first clutch and the second clutch, enabling an improvement in fuel economy of the engine.

According to an exemplary aspect, the rotor of the second rotary electric machine can be selectively fixed to the non-rotating member by the first brake and the second brake. In addition, in the state that the rotor of the second rotary electric machine is fixed by the first brake and the second brake and when the clutch is disengaged, the transmission device cuts off the transmission of rotation between the output shaft and the second rotary electric machine and also accelerates the rotation speed of the input shaft and transmits it to the output shaft. Therefore, under a low-load driving condition such as a high-speed cruise mode in which a driving force of the second rotary electric machine is not required to be transmitted to the output shaft, the drag loss and the core loss of the rotor of the second rotary electric machine can be suppressed by engaging the first brake and the second brake and disengaging the clutch, enabling an improvement in fuel economy of the engine.

According to an exemplary aspect, the operation of distributing the rotational driving force of the input shaft to the output shaft and to the first rotary electric machine by the power distribution device can be made appropriately.

According to an exemplary aspect, under a low-load driving condition such as a high-speed cruise mode in which a driving force of the second rotary electric machine is not required to be transmitted to the output shaft, the rotors of both the first rotary electric machine and the second rotary electric machine can be fixed by switching to the fixed accelerating mode to suppress the drag loss and the core loss of the rotors of the first and second rotary electric machines, and also the rotation speed of the input shaft can be accelerated and transmitted to the output shaft to prevent the rotation speed of the engine from becoming excessively high. Therefore, the fuel economy of the engine can be improved under such a low-load driving condition. On the other hand, under other driving conditions, by switching to the split normal mode, the rotational driving force of the input shaft can be distributed to the output shaft and the first rotary electric machine, and one of the first rotary electric machine and the second rotary electric machine can generate electric power while the other can perform power running, thereby enabling driving with the engine operating efficiently.

According to an exemplary aspect, when remaining electricity of an electric storage device, such as a battery, is reduced to a low level during driving in the fixed accelerating mode, switching the mode to the split accelerating mode makes the rotational driving force of the input shaft to be distributed to the first rotary electric machine and to the output shaft through the power distribution device, thus enabling the first rotary electric machine to generate electric power. Therefore, with this structure, under the low-load driving condition, such as the high-speed cruise mode, in which a driving force of the second rotary electric machine is not required to be transmitted to the output shaft, the drag loss and the core loss of the rotor of the second rotary electric machine can be suppressed, enabling an improvement in fuel economy of the engine, and also electric power generation is possible by switching the mode to the split accelerating mode, depending on necessity.

What is claimed is:

1. A hybrid drive unit, comprising:
   an input shaft connected to an engine;
   an output shaft connected to wheels;
   a first rotary electric machine;
   a second rotary electric machine connected to the output shaft through a transmission device;
   a power distribution device that distributes a rotational driving force of the input shaft to the output shaft and to the first rotary electric machine, wherein an output rotation element of the power distribution device is connected to a first rotation element of the transmission device;
   a second rotary electric machine fixing device that selectively fixes a rotor of the second rotary electric machine;
   a transmission cutoff device capable of cutting off transmission of rotation between the output shaft and the second rotary electric machine at least in a state when the rotor of the second rotary electric machine is fixed, wherein the transmission cutoff device includes a clutch that selectively connects the transmission device and the output rotation element of the power distribution device to the output shaft; and
   the output shaft is connected to a second rotation element of the transmission device; wherein
   the transmission device is capable of accelerating a rotation speed of the output rotation element and transmitting the rotation speed to the output shaft at least in the state when the clutch is disengaged and the rotor of the second rotary electric machine is fixed.

2. The hybrid drive unit according to claim 1, wherein the second rotary electric machine fixing device fixes the rotor of the second rotary electric machine when a rotation speed and a requested driving force of the output shaft are within a prescribed high-rotation speed and low-driving force range.

3. The hybrid drive unit according to claim 2, further comprising:

a first rotary electric machine fixing device that selectively fixes a rotor of the first rotary electric machine.

4. The hybrid drive unit according to claim 1, wherein the second rotary electric machine fixing device fixes the rotor of the second rotary electric machine when a rotation speed and a requested driving force of the output shaft are within a prescribed high-rotation speed and low-driving force range.

5. The hybrid drive unit according to claim 4, further comprising:
a first rotary electric machine fixing device that selectively fixes a rotor of the first rotary electric machine.

6. The hybrid drive unit according to claim 1, further comprising:
a first rotary electric machine fixing device that selectively fixes a rotor of the first rotary electric machine.

7. The hybrid drive unit according to claim 1, further comprising:
a first rotary electric machine fixing device that selectively fixes a rotor of the first rotary electric machine.

* * * * *